(12) United States Patent
Kaneko et al.

(10) Patent No.: US 10,099,378 B2
(45) Date of Patent: Oct. 16, 2018

(54) MOBILE ROBOT

(71) Applicant: HONDA MOTOR CO., LTD., Tokyo (JP)

(72) Inventors: Hiroyuki Kaneko, Saitama (JP); Tomoki Watabe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 711 days.

(21) Appl. No.: 14/841,849

(22) Filed: Sep. 1, 2015

(65) Prior Publication Data

US 2016/0096267 A1 Apr. 7, 2016

(30) Foreign Application Priority Data

Oct. 6, 2014 (JP) .................................. 2014-205687

(51) Int. Cl.
  *B25J 9/16* (2006.01)
  *B62D 57/032* (2006.01)

(52) U.S. Cl.
  CPC .......... *B25J 9/1694* (2013.01); *B62D 57/032* (2013.01); *Y10S 901/01* (2013.01)

(58) Field of Classification Search
  CPC ..... B62D 57/032; Y10S 901/01; B25J 9/1694
  USPC .......................... 180/8.1, 8.2, 8.5, 8.6; 901/1
  See application file for complete search history.

(56) References Cited

U.S. PATENT DOCUMENTS

| | | | | | |
|---|---|---|---|---|---|
| 4,834,200 A | * | 5/1989 | Kajita | .................... | B62D 57/02 180/8.1 |
| 5,221,883 A | * | 6/1993 | Takenaka | ............. | B62D 57/032 180/8.1 |
| 5,349,277 A | * | 9/1994 | Takahashi | ............ | B62D 57/032 180/8.6 |
| 5,357,433 A | * | 10/1994 | Takenaka | ............. | B62D 57/032 180/8.1 |
| 5,402,050 A | * | 3/1995 | Ozawa | ................. | B62D 57/032 180/8.6 |
| 5,404,086 A | * | 4/1995 | Takenaka | ............. | B62D 57/032 318/568.11 |
| 5,416,393 A | * | 5/1995 | Gomi | .................. | B62D 57/032 180/8.1 |
| 5,426,586 A | * | 6/1995 | Ozawa | ................. | B62D 57/032 180/8.1 |
| 6,064,167 A | * | 5/2000 | Takenaka | ............... | B25J 19/005 318/568.12 |

(Continued)

FOREIGN PATENT DOCUMENTS

| | | |
|---|---|---|
| JP | 2001-150370 | 6/2001 |
| JP | 3555107 | 5/2004 |

*Primary Examiner* — Joseph M Rocca
*Assistant Examiner* — Conan D Duda
(74) *Attorney, Agent, or Firm* — Rankin, Hill & Clark LLP

(57) ABSTRACT

A mobile robot 1 has a lower base body 6 and an upper base body 7, which is relatively rotatable with respect to the lower base body 6. The robot 1 is configured to be capable of performing a travel motion in which the robot 1 travels in a state wherein the front side of the upper base body 7 is oriented to face the same direction as the front side of the lower base body 6, and a travel motion in which the robot 1 travels in a state wherein the front side of the upper base body 7 is oriented to face the same direction as the rear side of the lower base body 6. The middle portion of each of leg links 3 can be bended toward either the front side or the rear side of the lower base body 6.

6 Claims, 11 Drawing Sheets

(56) References Cited

U.S. PATENT DOCUMENTS

| | | | |
|---|---|---|---|
| 6,243,623 B1* | 6/2001 | Takenaka | B62D 57/02 180/8.1 |
| 6,401,846 B1* | 6/2002 | Takenaka | B25J 19/0091 180/8.6 |
| 9,352,470 B1* | 5/2016 | da Silva | B25J 13/088 |
| 2001/0033145 A1* | 10/2001 | Filo | B62D 57/032 318/568.12 |
| 2002/0120361 A1* | 8/2002 | Kuroki | G05B 19/00 700/245 |
| 2003/0009259 A1* | 1/2003 | Hattori | B25J 13/085 700/245 |
| 2003/0036818 A1* | 2/2003 | Hattori | B62D 57/032 700/245 |
| 2003/0114960 A1* | 6/2003 | Takenaka | B62D 57/02 700/245 |
| 2003/0125839 A1* | 7/2003 | Takenaka | B62D 57/02 700/245 |
| 2003/0139849 A1* | 7/2003 | Kuroki | B62D 57/02 700/245 |
| 2003/0173926 A1* | 9/2003 | Hattori | B62D 57/032 318/567 |
| 2003/0229419 A1* | 12/2003 | Ishida | B62D 57/032 700/245 |
| 2004/0003950 A1* | 1/2004 | Ogawa | B62D 57/032 180/8.1 |
| 2004/0027086 A1* | 2/2004 | Ogawa | B25J 19/005 318/568.12 |
| 2004/0044440 A1* | 3/2004 | Takenaka | B62D 57/032 700/245 |
| 2004/0051493 A1* | 3/2004 | Furuta | B62D 57/032 318/568.12 |
| 2004/0060746 A1* | 4/2004 | Furuta | B25J 13/081 180/8.6 |
| 2004/0107780 A1* | 6/2004 | Kawai | B62D 57/032 73/862.08 |
| 2004/0116836 A1* | 6/2004 | Kawai | B62D 57/032 600/595 |
| 2004/0143369 A1* | 7/2004 | Takenaka | B62D 57/032 700/245 |
| 2004/0167641 A1* | 8/2004 | Kawai | A61B 5/1038 700/63 |
| 2004/0172165 A1* | 9/2004 | Iribe | B62D 57/032 700/245 |
| 2004/0206164 A1* | 10/2004 | Kawai | B62D 57/032 73/65.07 |
| 2004/0211603 A1* | 10/2004 | Furuta | B62D 57/032 180/8.1 |
| 2005/0011685 A1* | 1/2005 | Takenaka | B25J 19/0091 180/8.6 |
| 2005/0021176 A1* | 1/2005 | Takenaka | B62D 57/02 700/245 |
| 2005/0055131 A1* | 3/2005 | Mikami | B62D 57/02 700/245 |
| 2005/0075755 A1* | 4/2005 | Takenaka | B62D 57/032 700/245 |
| 2005/0077856 A1* | 4/2005 | Takenaka | B25J 19/0091 318/568.12 |
| 2005/0080590 A1* | 4/2005 | Kawai | B25J 13/085 702/141 |
| 2005/0107916 A1* | 5/2005 | Nagasaka | B62D 57/02 700/245 |
| 2005/0110448 A1* | 5/2005 | Takenaka | B62D 57/02 318/568.12 |
| 2005/0113973 A1* | 5/2005 | Endo | B25J 9/161 700/245 |
| 2005/0120820 A1* | 6/2005 | Takenaka | B25J 19/0091 74/490 |
| 2005/0151496 A1* | 7/2005 | Furuta | B62D 57/02 318/568.12 |
| 2005/0151497 A1* | 7/2005 | Nagasaka | B62D 57/032 318/568.12 |
| 2005/0167167 A1* | 8/2005 | Miyazaki | B25J 9/102 180/8.2 |
| 2006/0011391 A1* | 1/2006 | Isozumi | B25J 19/0091 180/8.1 |
| 2006/0149420 A1* | 7/2006 | Ikeuchi | B62D 57/032 700/245 |
| 2006/0195223 A1* | 8/2006 | Kawai | B62D 57/032 700/245 |
| 2006/0197485 A1* | 9/2006 | Kawai | B62D 57/032 318/568.12 |
| 2006/0200272 A1* | 9/2006 | Kawai | B62D 57/032 700/245 |
| 2006/0243498 A1* | 11/2006 | Takemura | B25J 17/0283 180/8.1 |
| 2006/0247800 A1* | 11/2006 | Takenaka | B62D 57/032 700/54 |
| 2007/0016329 A1* | 1/2007 | Herr | A61F 2/68 700/250 |
| 2007/0145930 A1* | 6/2007 | Zaier | B62D 57/032 318/568.12 |
| 2007/0156283 A1* | 7/2007 | Takenaka | B25J 9/1664 700/245 |
| 2007/0168080 A1* | 7/2007 | Takenaka | B62D 57/032 700/245 |
| 2007/0193789 A1* | 8/2007 | Takenaka | B25J 19/0091 180/8.1 |
| 2007/0241713 A1* | 10/2007 | Yamamoto | B62D 57/032 318/568.12 |
| 2007/0267994 A1* | 11/2007 | Sugihara | B62D 57/032 318/568.12 |
| 2008/0046123 A1* | 2/2008 | Takenaka | B62D 57/032 700/245 |
| 2008/0109115 A1* | 5/2008 | Lim | B62D 57/032 700/258 |
| 2008/0154430 A1* | 6/2008 | Nakamura | B62D 57/032 700/259 |
| 2008/0257615 A1* | 10/2008 | Xie | C09J 7/35 180/8.7 |
| 2008/0290743 A1* | 11/2008 | Kalik | H02K 7/1892 310/37 |
| 2008/0300721 A1* | 12/2008 | Takenaka | B62D 57/032 700/253 |
| 2009/0005906 A1* | 1/2009 | Tajima | B62D 57/032 700/245 |
| 2009/0009124 A1* | 1/2009 | Suga | B62D 57/032 318/568.12 |
| 2009/0166103 A1* | 7/2009 | Bowers | A01B 51/02 180/8.1 |
| 2009/0166105 A1* | 7/2009 | Bowers | A01B 51/02 180/8.6 |
| 2009/0171503 A1* | 7/2009 | Takenaka | B62D 57/032 700/250 |
| 2009/0187275 A1* | 7/2009 | Suga | B62D 57/032 700/245 |
| 2009/0200090 A1* | 8/2009 | Takanishi | B25J 13/085 180/8.6 |
| 2009/0260472 A1* | 10/2009 | Suga | B62D 57/032 74/490.05 |
| 2009/0301798 A1* | 12/2009 | Yang | B62D 57/032 180/8.6 |
| 2009/0306821 A1* | 12/2009 | Park | B62D 57/032 700/245 |
| 2009/0306824 A1* | 12/2009 | Zaier | B62D 57/032 700/250 |
| 2009/0308668 A1* | 12/2009 | Roh | B62D 57/032 180/8.6 |
| 2010/0000365 A1* | 1/2010 | Ogawa | B62D 57/032 74/490.05 |
| 2010/0070076 A1* | 3/2010 | Zaier | B62D 57/032 700/245 |
| 2010/0138043 A1* | 6/2010 | Kajima | B62D 57/032 700/261 |
| 2010/0161115 A1* | 6/2010 | Kwak | B62D 57/032 700/245 |
| 2010/0161116 A1* | 6/2010 | Kwak | B62D 57/032 700/245 |

(56) References Cited

U.S. PATENT DOCUMENTS

| | | | |
|---|---|---|---|
| 2010/0161118 A1* | 6/2010 | Kwak | B62D 57/032 700/245 |
| 2010/0185330 A1* | 7/2010 | Kwon | B62D 57/032 700/261 |
| 2010/0222927 A1* | 9/2010 | Zaier | B62D 57/032 700/254 |
| 2010/0292838 A1* | 11/2010 | Goswami | B25J 9/163 700/246 |
| 2011/0022232 A1* | 1/2011 | Yoshiike | B62D 57/032 700/260 |
| 2011/0040410 A1* | 2/2011 | Kim | B62D 57/032 700/260 |
| 2011/0098856 A1* | 4/2011 | Yoshiike | B62D 57/032 700/246 |
| 2011/0098857 A1* | 4/2011 | Yoshiike | B62D 57/032 700/246 |
| 2011/0106309 A1* | 5/2011 | Lim | B62D 57/032 700/250 |
| 2011/0172817 A1* | 7/2011 | Park | B25J 9/162 700/245 |
| 2011/0172823 A1* | 7/2011 | Kim | B62D 57/032 700/260 |
| 2011/0172824 A1* | 7/2011 | Park | B25J 9/1648 700/261 |
| 2011/0178637 A1* | 7/2011 | Lee | B25J 9/1648 700/254 |
| 2011/0224827 A1* | 9/2011 | Andoh | B62D 57/032 700/258 |
| 2011/0264264 A1* | 10/2011 | Shirokura | B62D 57/032 700/245 |
| 2011/0297461 A1* | 12/2011 | Miyazaki | A63H 11/00 180/8.6 |
| 2012/0059518 A1* | 3/2012 | Lee | B62D 57/032 700/261 |
| 2012/0065778 A1* | 3/2012 | Lim | B62D 57/032 700/254 |
| 2012/0078416 A1* | 3/2012 | Iba | B62D 57/032 700/246 |
| 2012/0143376 A1* | 6/2012 | Seo | B25J 9/104 700/261 |
| 2012/0155775 A1* | 6/2012 | Ahn | G06T 7/0042 382/195 |
| 2012/0158175 A1* | 6/2012 | Lee | B62D 57/032 700/246 |
| 2012/0158181 A1* | 6/2012 | Seo | B62D 57/032 700/261 |
| 2012/0165980 A1* | 6/2012 | Kim | B25J 9/162 700/254 |
| 2012/0165987 A1* | 6/2012 | Kim | B62D 57/032 700/261 |
| 2012/0245735 A1* | 9/2012 | Lee | B62D 57/032 700/255 |
| 2012/0259463 A1* | 10/2012 | Orita | B25J 9/1648 700/245 |
| 2012/0310412 A1* | 12/2012 | Seo | B25J 9/0006 700/254 |
| 2012/0316682 A1* | 12/2012 | Seo | B62D 57/032 700/261 |
| 2012/0316683 A1* | 12/2012 | Seo | B62D 57/032 700/261 |
| 2012/0316684 A1* | 12/2012 | Lee | B62D 57/032 700/261 |
| 2013/0013113 A1* | 1/2013 | Choi | G05B 15/00 700/262 |
| 2013/0079929 A1* | 3/2013 | Lim | B62D 57/032 700/250 |
| 2013/0116820 A1* | 5/2013 | Lee | B62D 57/032 700/254 |
| 2013/0116823 A1* | 5/2013 | Ahn | G05D 1/027 700/258 |
| 2013/0131865 A1* | 5/2013 | Yamane | B25J 9/1692 700/254 |
| 2013/0144439 A1* | 6/2013 | Lee | B25J 9/1633 700/261 |
| 2013/0144441 A1* | 6/2013 | Kanazawa | B25J 9/1607 700/263 |
| 2013/0158712 A1* | 6/2013 | Lee | G05B 19/04 700/261 |
| 2013/0162015 A1* | 6/2013 | Kim | B62D 57/02 305/1 |
| 2013/0211586 A1* | 8/2013 | Lee | B62D 57/032 700/245 |
| 2013/0218345 A1* | 8/2013 | Lee | B25J 9/162 700/261 |
| 2013/0231822 A1* | 9/2013 | Gouaillier | B62D 57/032 701/23 |
| 2013/0258100 A1* | 10/2013 | Asatani | G01C 3/08 348/140 |
| 2014/0005827 A1* | 1/2014 | Ogawa | B25J 9/1674 700/250 |
| 2014/0249670 A1* | 9/2014 | Yamane | B25J 9/1602 700/245 |
| 2015/0073592 A1* | 3/2015 | Kaneko | B62D 57/024 700/245 |
| 2015/0122559 A1* | 5/2015 | Nagatsuka | B25J 9/1065 180/8.6 |
| 2015/0202768 A1* | 7/2015 | Moridaira | B62D 57/032 700/258 |
| 2015/0336273 A1* | 11/2015 | Moriniere | B25J 9/1694 702/152 |
| 2016/0089785 A1* | 3/2016 | Kamioka | B25J 9/1605 700/245 |
| 2016/0089786 A1* | 3/2016 | Kamioka | B25J 9/1633 700/260 |
| 2016/0185405 A1* | 6/2016 | Takanishi | B62D 57/032 180/8.3 |
| 2016/0236349 A1* | 8/2016 | Yamane | B25J 9/1664 |
| 2016/0241762 A1* | 8/2016 | Ono | H04N 5/2257 |
| 2016/0327383 A1* | 11/2016 | Becker | G01B 11/005 |
| 2016/0347386 A1* | 12/2016 | Matsunami | G05D 1/024 |
| 2016/0361813 A1* | 12/2016 | Fei | B25J 9/08 |
| 2017/0010620 A1* | 1/2017 | Watabe | G05D 1/0248 |
| 2017/0036346 A1* | 2/2017 | Kamioka | B62D 57/032 |
| 2017/0165836 A1* | 6/2017 | Kanazawa | B25J 9/1669 |
| 2017/0183047 A1* | 6/2017 | Takagi | B25J 9/1664 |
| 2017/0327165 A1* | 11/2017 | Yamaguchi | B62D 57/032 |
| 2018/0001471 A1* | 1/2018 | Kanazawa | B25J 9/1664 |
| 2018/0186000 A1* | 7/2018 | Xiong | B25J 9/12 |
| 2018/0186015 A1* | 7/2018 | Xiong | B25J 17/00 |
| 2018/0186016 A1* | 7/2018 | Xiong | B25J 17/00 |

* cited by examiner

MOBILE ROBOT

BACKGROUND OF THE INVENTION

1. Field of the Invention

The present invention relates to a mobile robot having a plurality of movable links extended from a base body.

2. Description of the Related Art

As a mobile robot having a plurality of movable links extended from a base body thereof, there has conventionally been known in general a humanoid robot provided with two leg links and two arm links as movable links, as described in, for example, Japanese Patent No. 3555107 (hereinafter referred to as "Patent Document 1").

This type of a mobile robot is configured such that the distal end parts of the movable links are moved with respect to the base body by the motions of the joints provided between the distal end portions of the movable links and the base body.

Further, when traveling on a level ground or the like, the mobile robot usually travels in the direction of the front side of the base body thereof while observing the conditions in an external world on the front side of the base body of the mobile robot, i.e. external world ahead in a traveling direction of the mobile robot, by a camera or the like.

In recent years, a mobile robot, such as the one described in Patent Document 1, has been expected to be capable of traveling in a variety of environments rather than being limited to a smooth environment, such as a level ground.

However, conventional mobile robots are designed on the basis of an assumption that they will travel mainly in smooth environments, such as level grounds. Hence, if the mobile robots are operated in a variety of environments, then interference between the parts of the mobile robots and objects in the external world tends to take place.

More specifically, the leg links of the mobile robot as described in Patent Document 1 are normally configured such that the middle portions (e.g. the knees) are bendable so as to jut out to the front side of the base body. Therefore, when the mobile robot is instructed to climb up a relatively high step or to climb up or down a ladder or a stepladder, the leg links easily interfere with the step, the ladder or the stepladder.

Further, when the mobile robot is instructed to travel on, for example, an irregular terrain or the like in a state in which the mobile robot supports its own weight by the leg links and the arm links thereof (hereinafter referred to as "the multi-legged state" in some cases), the middle portions of the leg links tend to interfere with projections on a floor or the base body thereof.

Thus, a situation in which it is difficult for the mobile robot to travel frequently occurs.

As a conceivable solution to such an inconvenience, the leg links, for example, could be configured such that the middle portions thereof are bendable toward the rear side, as well as the front side, of the base body.

Inconveniently, however, such a solution will easily result in a complicated construction of each leg link or an increase in size or weight of each leg link to enhance the rigidity of the leg link. There will be another inconvenience in which the singularity state of the leg links easily occurs.

Further, when the mobile robot is instructed to, for example, climb up a relatively high step, the mobile robot could be instructed to travel in the direction of the rear side of the base body (i.e. the mobile robot could be instructed to travel backward). Alternatively, when the mobile robot is instructed to climb up or down a ladder or the like, the mobile robot could be instructed to climb up or down the ladder or the like with the rear side of the base body thereof facing the ladder or the like. Further alternatively, when the mobile robot is instructed to travel in the multi-legged state, the mobile robot could be instructed to travel with the rear side of the base body thereof facing a floor surface.

In such cases, however, it will be required to add a device that permits the observation of the conditions of the external world on the rear side as well as the front side of the base body of the mobile robot.

In addition, the arm links of the mobile robot are normally configured such that the distal end portions thereof can be moved over an extensive range on the front side of the base body. In many cases, the movable range of the distal end portions of the arm links on the rear side of the base body inevitably becomes limited.

Hence, when the mobile robot is to climb a relatively high step, if the mobile robot is instructed to travel in the direction of the rear of the base body thereof, then it will be necessary to switch the direction of the mobile robot at a destination after the travel. This will require a space for accomplishing the switching of the direction. Further, if the mobile robot is instructed to climb up or down a ladder or the like with the rear side of the base body thereof facing the ladder or the like, or when the mobile robot is instructed to travel in the multi-legged state, it will be usually difficult to properly move the arm links.

SUMMARY OF THE INVENTION

The present invention has been made in view of the background described above, and an object of the invention is to provide a mobile robot capable of accurately traveling while avoiding the interference with an external world object or the like in a variety of environments.

To this end, a first mode of a mobile robot in accordance with the present invention is a mobile robot including: a base body assembly; a plurality of movable links including a plurality of leg links extended from the base body assembly; and a joint provided between a distal end portion of each of the movable links and the base body assembly such that each of the movable links can be moved with respect to the base body assembly, wherein the base body assembly is comprised of a lower base body from which the plurality of leg links are extended and an upper base body connected to the lower base body such that the upper base body is relatively rotatable about an axial center in the direction of a trunk axis with respect to the lower base body, the upper base body can be operated in a state in which a front side of the upper base body is oriented to face the same direction as a front side of the lower base body and a state in which the front side of the upper base body is oriented to face the same direction as a rear side of the lower base body by the relative rotation about the axial center in the direction of the trunk axis, each of the leg links is configured to be bendable such that a middle portion between a distal end portion thereof and the lower base body juts out toward either the front side or the rear side of the lower base body, the mobile robot includes at least one of an external world condition observation instrument for observing an external world condition on the front side of the upper base body and an arm link as a movable link extended from the upper base body, and the mobile robot is configured to be capable of selectively performing a first travel motion, in which the mobile robot travels in the direction of a front of the upper base body by a motion in which a distal end portion of each of the plurality of the leg links is lifted off and then landed following the lifting off in a state in which the front side of the upper base body is oriented to face the same direction as the front side of the lower base body, and a second travel motion, in which the mobile robot travels in the direction of the front side of the upper base body by a motion in which a distal end portion of each of the plurality of the leg links is lifted off and then landed following the lifting off in a state in which the front side of the upper base body is oriented to face the same direction as the rear side of the lower base body (a first aspect of the invention).

In the present invention, the term "landing" of the distal end portion of each movable link means that the distal end portion is brought into contact with an external world object such that the distal end portion is subjected to a contact reaction force against the gravitational force acting on the mobile robot. In this case, the external world object is not limited to a floor, a ground surface or the like, and may be any object.

According to the first aspect of the invention, even when each of the leg links is configured such that the middle portion thereof can be bent to jut out only on the front side or the rear side of the lower base body, the middle portion of the leg link can be bent to jut out toward one of the forward side of the traveling direction of the mobile robot (toward the front side of the upper base body) and the backward side of the traveling direction (toward the rear side of the upper base body) in the first travel motion. Further, in the second travel motion, the middle portion of each of the leg links can be bent to jut out toward the other of the forward side of the traveling direction of the mobile robot (toward the front side of the upper base body) and the backward side of the traveling direction (toward the rear side of the upper base body).

This arrangement makes it possible to select either the first travel motion or the second travel motion according to an external world condition or the like and to instruct the mobile robot to travel in the selected travel motion, thereby enabling the mobile robot to travel while avoiding the interference between an external world object ahead in the traveling direction of the mobile robot (the front side of the upper base body) or an external world object behind in the traveling direction (the rear side of the upper base body) and the leg links.

For example, when instructing the mobile robot to climb up relatively high steps, the mobile robot can be instructed to climb up the steps in the state in which the middle portion of each of the leg links can be bent to jut out in the direction opposite from the forward side of the traveling direction of the mobile robot (the front side of the upper base body). This consequently makes it possible to avoid the interference between the leg links of the mobile robot and the wall surfaces of the steps or the like.

Further, if the mobile robot is provided with the external world condition observation instrument, then it is possible for the mobile robot to travel while observing, by the external world condition observation instrument, the external world condition on the front side of the upper base body, i.e. the forward side in the traveling direction of the mobile robot in both the first travel motion and the second travel motion.

Further, in the case of the mobile robot provided with the arm links, even if the arm links are configured such that the main movable range of the distal end portions of the arm links lies on the front side of the upper base body, an operation or the like for changing the orientations of the leg links of the mobile robot is not required at a travel destination of the mobile robot, thus making it possible to promptly start a required task performed by the motions of the distal end portions of the arm links.

As described above, the mobile robot according to the first aspect of the invention is capable of properly traveling while avoiding the interference with external world objects and the like in a variety of environments.

In the first aspect of the invention, if the mobile robot is provided with the arm link, the mobile robot is preferably configured to be capable of selectively performing a third travel motion, in which the mobile robot travels by a motion in which a distal end portion of each of the plurality of the leg links and the arm link is lifted off and then landed on the front side of the upper base body following the lifting off in a state in which the front side of the upper base body is oriented to face the same direction as the front side of the lower base body, and a fourth travel motion, in which the mobile robot travels by a motion in which the distal end portion of each of the plurality of the leg links and the arm link is lifted off and then landed on the front side of the upper base body following the lifting off in a state in which the front side of the upper base body is oriented to face the same direction as the rear side of the lower base body, in addition to the first travel motion and the second travel motion (a second aspect of the invention).

The second aspect of the invention enables the mobile robot to travel in the third travel motion or the fourth travel motion in addition to the first travel motion and the second travel motion. This enables the mobile robot to travel in an environment having an external world object located above, such as a relatively low ceiling, or enables the mobile robot to climb up or down a structure having a steep slope, such as a ladder or a stepladder.

In this case, in the third travel motion, the middle portion of each leg link can be bent to jut out toward one of the front side of the upper base body of the mobile robot (the side on which the distal end portions of the leg links and the arm links are landed) and the rear side of the upper base body. Further, in the fourth travel motion, the middle portion of each leg link can be bent to jut out toward the other of the front side of the upper base body of the mobile robot (the side on which the distal end portions of the leg links and the arm links are landed) and the rear side of the upper base body.

Thus, either the third travel motion or the fourth travel motion is selected according to an external world condition or the like, and the mobile robot travels in the selected travel motion, thus enabling the mobile robot to travel while avoiding the interference between an external world object on the front side of the upper base body (the side on which the distal end portions of the leg links and the arm links are landed) of the mobile robot or an external world object on the rear side of the upper base body and the leg links.

For example, in the case where a relatively tall projection to be ridden over lies on a floor surface or a ground surface in an environment in which the mobile robot travels or an external world object projecting downward lies above the mobile robot, the mobile robot can be instructed to travel, enabling the mobile robot to avoid the interference between the leg links and the projection or the external world object or the base body of the mobile robot.

Further, when the mobile robot is instructed to, for example, climb up or down a structure having a steep slope, such as a ladder or a stepladder, it is possible to instruct the mobile robot to be able to climb up or down the ladder or the stepladder or the like without the occurrence of the interference between the leg links and the ladder or the stepladder or the like.

Thus, the second aspect of the invention permits proper travel of the mobile robot in a greater variety of environments.

Further, in the first aspect or the second aspect of the invention, the mobile robot may adopt a mode provided with two leg links, namely, a leg link on the right side and a leg link on the left side, as observed facing the front of the lower base body and two arm links, namely, an arm link on the right side and an arm link on the left side, as observed facing the front of the upper base body.

In this case, in the state in which the front side of the upper base body is oriented to face the same direction as the front side of the lower base body, the arm link on the right side and the arm link on the left side with respect to the upper base body will be the movable links on the right side and the left side, respectively, as observed facing the front of the lower base body. Meanwhile, in the state in which the front side of the upper base body is oriented to face the same direction as the rear side of the lower base body, the arm link on the right side and the arm link on the left side with respect to the upper base body will be the movable links on the left side and the right side, respectively, as observed facing the front side of the lower base body. Accordingly, the right and the left of the two arm links observed from the lower base body are reversed between the state in which the front side of the upper base body is oriented to face the same direction as the front side of the lower base body and the state in which the front side of the upper base body is oriented to face the same direction as the rear side of the lower base body.

Therefore, in the case where the mobile robot is provided with the two leg links and the two arm links as described above, if the first travel motion and the second travel motion are travel motions in which the two arm links are moved based on the motions of the two leg links, then the first travel motion and the second travel motion are preferably performed such that a motion pattern of the arm link on the right side based on the motions of the two leg links in the first travel motion and a motion pattern of the arm link on the left side based on the motions of the two leg links in the second travel motion agree with each other, and a motion pattern of the arm link on the left side based on the motions of the two leg links in the first travel motion and a motion pattern of the arm link on the right side based on the motions of the two leg links in the second travel motion agree with each other (a third aspect of the invention).

In the third aspect of the invention, the mutual agreement between the motion pattern of the arm link on the right side based on the motions of the two leg links in the first travel motion and the motion pattern of the arm link on the left side based on the motions of the two leg links in the second travel motion more specifically means that there is agreement between a direction in which the arm link on the right side (the right side observed facing the front of the upper base body) is moved at a timing specified on the basis of the motions of the leg links on the right side and the left side (the right side and the left side observed facing the front of the lower base body) in the first travel motion and a direction in which the arm link on the left side (the left side observed facing the front of the upper base body) is moved at the same timing as the foregoing timing in the second travel motion.

Similarly, the mutual agreement between the motion pattern of the arm link on the left side based on the motions of the two leg links in the first travel motion and the motion pattern of the arm link on the right side based on the motions of the two leg links in the second travel motion more specifically means that there is agreement between a direction in which the arm link on the left side (the left side observed facing the front of the upper base body) is moved at a timing specified on the basis of the motions of the leg links on the right side and the left side (the right side and the left side observed facing the front of the lower base body) in the first travel motion and a direction in which the arm link on the right side (the right side observed facing the front of the upper base body) is moved at the same timing as the foregoing timing in the second travel motion.

According to the third aspect of the invention, the arm link on the right side and the arm link on the left side observed facing the front of the upper base body can be moved in the same pattern according to the motions of the two leg links in both the first travel motion and the second travel motion. Hence, the joints of the mobile robot can be moved in the same manner in the first travel motion and the second travel motion.

Further, in the second aspect of the invention, in the case where the mobile robot is provided with two leg links, namely, a leg link on the right side and a leg link on the left side as observed facing the front of the lower base body and two arm links, namely, an arm link on the right side and an arm link on the left side as observed facing the front of the upper base body, if the third travel motion and the fourth travel motion are travel motions in which the two arm links are moved according to the motions of the two leg links, then the third travel motion and the fourth travel motion are preferably performed such that a motion pattern of the arm link on the right side based on the motions of the two leg links in the third travel motion and a motion pattern of the arm link on the left side based on the motions of the two leg links in the fourth travel motion agree with each other and a motion pattern of the arm link on the left side based on the motions of the two leg links in the third travel motion and a motion pattern of the arm link on the right side based on the motions of the two leg links in the fourth travel motion agree with each other (a fourth aspect of the invention).

In the fourth aspect of the invention, the mutual agreement between the motion pattern of the arm link on the right side based on the motions of the two leg links in the third travel motion and the motion pattern of the arm link on the left side based on the motions of the two leg links in the fourth travel motion more specifically means that there is agreement between a direction in which the arm link on the right side is moved at a timing specified on the basis of the motions of the leg links on the right side and the left side in the third travel motion and a direction in which the arm link on the left side is moved at the same timing as the foregoing timing in the fourth travel motion.

Similarly, the mutual agreement between the motion pattern of the arm link on the left side based on the motions of the two leg links in the third travel motion and the motion pattern of the arm link on the right side based on the motions of the two leg links in the fourth travel motion more specifically means that there is agreement between a direction in which the arm link on the left side is moved at a timing specified on the basis of the motions of the leg links on the right side and the left side in the third travel motion and a direction in which the arm link on the right side is moved at the same timing as the foregoing timing in the fourth travel motion.

According to the fourth aspect of the invention, the arm link on the right side and the arm link on the left side observed facing the front of the upper base body can be moved in the same pattern according to the motions of the two leg links in both the third travel motion and the fourth travel motion. Hence, the joints of the mobile robot can be moved in the same manner in the third travel motion and the fourth travel motion.

The fourth aspect of the invention may be combined with the third aspect of the invention.

A second mode of the mobile robot in accordance with the present invention is a mobile robot that includes: a base body assembly; a plurality of movable links including a plurality of leg links extended from the base body assembly; and a joint provided between a distal end portion of each of the movable links and the base body assembly such that each of the movable links can be moved with respect to the base body assembly, wherein the base body assembly is comprised of a lower base body from which the plurality of leg links are extended and an upper base body connected to the lower base body such that the upper base body is relatively rotatable about an axial center in the direction of a trunk axis with respect to the lower base body, the upper base body can be placed in a state in which a front side of the upper base body is oriented to face the same direction as a front side of the lower base body and a state in which the front side of the upper base body is oriented to face the same direction as a rear side of the lower base body by the relative rotation about the axial center in the direction of the trunk axis, each of the leg links is configured to be bendable such that a middle portion thereof between a distal end portion thereof and the lower base body juts out toward either the front side or the rear side of the lower base body, the mobile robot includes an arm link as a movable link extended from the upper base body, and the mobile robot is configured to be capable of selectively performing a third travel motion, in which the mobile robot travels by a motion in which a distal end portion of each of the plurality of the leg links and the arm link is lifted off and then landed on the front side of the upper base body following the lifting off in a state in which the front side of the upper base body is oriented to face the same direction as the front side of the lower base body, and a fourth travel motion, in which the mobile robot travels by a motion in which a distal end portion of each of the plurality of the leg links and the arm link is lifted off and then landed on the front side of the upper base body following the lifting off in a state in which the front side of the upper base body is oriented to face the same direction as the rear side of the lower base body (a fifth aspect of the invention).

The fifth aspect of the invention enables the mobile robot to travel in an environment having an external world object located above, such as a relatively low ceiling, or to climb up or down a structure having a steep slope, such as a ladder or a stepladder by instructing the mobile robot to travel in the third travel motion or the fourth travel motion.

In this case, in the third travel motion, the middle portion of each leg link can be bent to jut out toward one of the front side of the upper base body of the mobile robot (the side on which the distal end portions of the leg links and the arm link are landed) and the rear side of the upper base body. Further, in the fourth travel motion, the middle portion of each leg link can be bent to jut out toward the other of the front side of the upper base body of the mobile robot (the side on which the distal end portions of the leg links and the arm link are landed) and the rear side of the upper base body.

Thus, either the third travel motion or the fourth travel motion is selected according to an external world condition or the like, and the mobile robot travels in the selected travel motion. This enables the mobile robot to avoid the interference between an external world object on the front side of the upper base body (the side on which the distal end portions of the leg links and the arm link are landed) of the mobile robot or an external world object on the rear side of the upper base body and the leg links while traveling.

For example, in the case where a relatively tall projection to be ridden over lies on a floor or a ground surface in an environment in which the mobile robot travels or an external world object projecting downward is present above the mobile robot, the mobile robot can be instructed to travel, avoiding the interference between the leg links and the projection or the external world object or the base body of the mobile robot.

Further, when the mobile robot is instructed to, for example, climb up or down a structure having a steep slope, such as a ladder or a stepladder, the mobile robot can be instructed to climb up or down the ladder or the stepladder or the like without the occurrence of the interference between the leg links and the ladder or the stepladder or the like.

Thus, the mobile robot according to the fifth aspect of the invention is capable of properly traveling in a variety of environments, avoiding the interference with external world objects or the like.

The mobile robot according to the fifth aspect of the invention can be configured to be capable of performing either the first travel motion or the second travel motion described in the first aspect of the invention in addition to the third travel motion and the fourth travel motion.

In the fifth aspect of the invention, the mobile robot may adopt a mode provided with two leg links, namely, a leg link on a right side and a leg link on a left side, as observed facing the front of the lower base body, and two arm links, namely, an arm link on the right side and an arm link on the left side, as observed facing the front of the upper base body.

In this case, as with the fourth aspect of the invention, in the case where the third travel motion and the fourth travel motion are travel motions in which the two arm links are moved according to the motions of the two leg links, the third travel motion and the fourth travel motion are preferably performed such that a motion pattern of the arm link on the right side based on the motions of the two leg links in the third travel motion and a motion pattern of the arm link on the left side based on the motions of the two leg links in the fourth travel motion agree with each other and a motion pattern of the arm link on the left side based on the motions of the two leg links in the third travel motion and a motion pattern of the arm link on the right side based on the motions of the two leg links in the fourth travel motion agree with each other (a sixth aspect of the invention).

In the sixth aspect of the invention, the more specific meaning of the agreement between the motion pattern of the arm link on the right side based on the motions of the two leg links in the third travel motion and the motion pattern of the arm link on the left side based on the motions of the two leg links in the fourth travel motion and the agreement between the motion pattern of the arm link on the left side based on the motions of the two leg links in the third travel motion and the motion pattern of the arm link on the right side based on the motions of the two leg links in the fourth travel motion is the same as the meaning in the fourth aspect of the invention.

According to the sixth aspect of the invention, the arm link on the right side and the arm link on the left side as observed facing the front of the upper base body can be moved in the same pattern according to the motions of the two leg links in both the third travel motion and the fourth travel motion. Hence, the joints of the mobile robot can be moved in the same manner in the third travel motion and the fourth travel motion.

DESCRIPTION OF THE PREFERRED EMBODIMENTS

An embodiment of the present invention will be described below with reference to FIG. 1 to FIG. 13.

Figure 1:
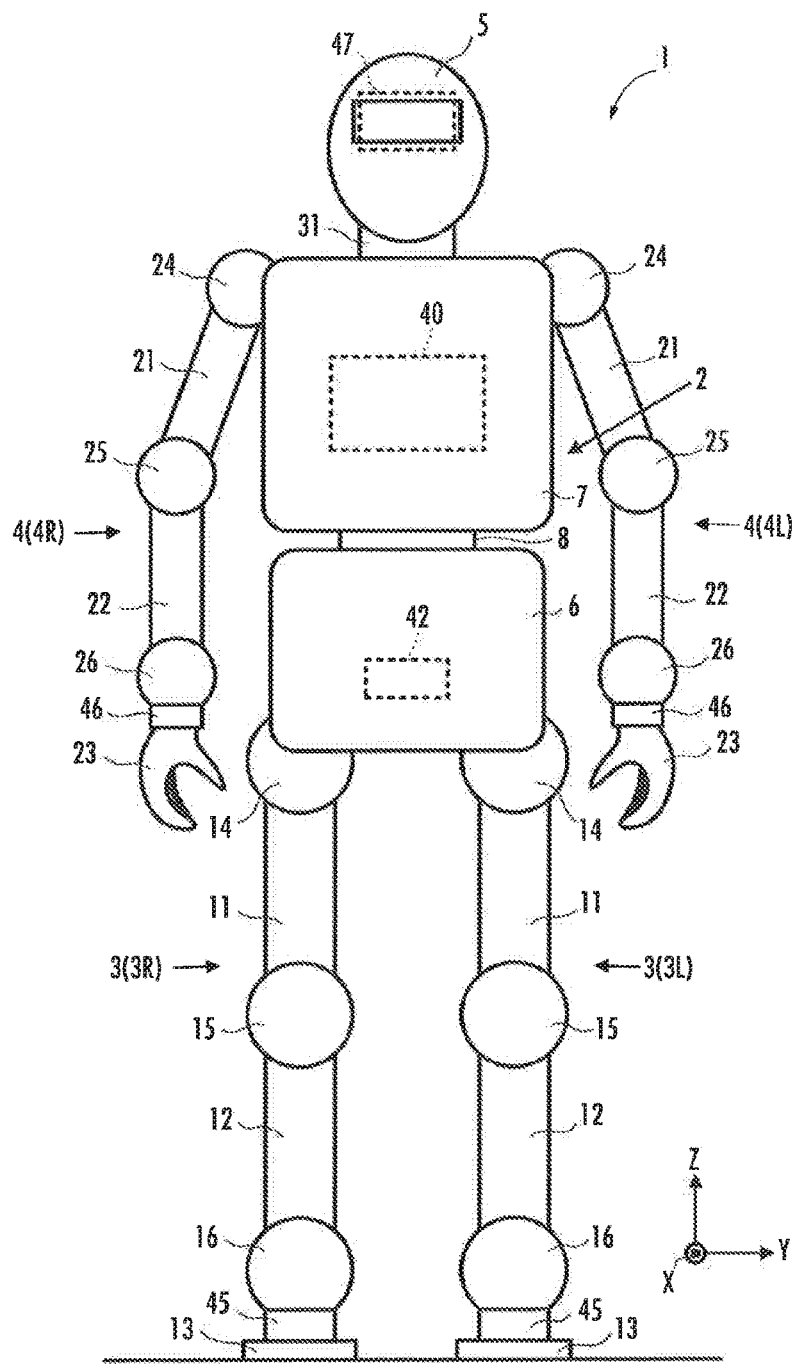
FIG. 1 is a diagram illustrating the construction of a mobile robot according to an embodiment of the present invention.

Referring to FIG. 1, a mobile robot 1 according to the present embodiment is an example of a humanoid robot. The mobile robot 1 (hereinafter referred to simply as "the robot 1" in some cases) has a base body assembly 2 corresponding to an upper body, a pair of left and right (two) leg links 3L, 3R and a pair of left and right (two) arm links 4L, 4R, which serve as a plurality of movable links connected to the base body assembly 2, and a head 5.

In the description of the present embodiment, the reference characters L and R used in the leg links 3L, 3R and the like denote the left side and the right side, respectively. If, however, there is no need to distinguish the left and the right, then the reference characters L and R will be omitted.

The base body assembly 2 is comprised of a lower base body 6 constituting the lower part of the base body assembly 2, an upper base body 7 constituting the upper part thereof, and a joint mechanism part 8 that connects the lower base body 6 and the upper base body 7. The joint mechanism part 8 is composed of two joints (not illustrated) so as to have a degree of freedom of rotation of a total two axes, namely, for example, a yaw axis and a pitch axis.

In the description of the present embodiment, unless otherwise specified, the term "joint" means a joint that has a degree of freedom of rotation about one axis. Such a joint is constructed of two members that can be relatively rotated about a single axis. The joint may adopt a publicly known structure.

Further, in the description of the present embodiment, the yaw axis, the pitch axis and a roll axis mean an axis in a vertical direction (Z-axis), an axis in a lateral direction (Y-axis), and an axis in a longitudinal direction (X-axis) of the robot 1 when the robot 1 is in an upright state (a state in which the base body assembly 2, the leg links 3 and the arm links 4 are stretched in a substantially vertical direction), as illustrated in FIG. 1. In this case, the yaw axis is the trunk axis of the base body assembly 2.

In the present embodiment, a joint that rotates about the yaw axis of the joint mechanism part 8 is configured to allow the upper base body 7 to relatively rotate about the yaw axis, i.e., the trunk axis, with respect to the lower base body 6 at a rotational angle of 180 degrees or more.

Figure 2A:
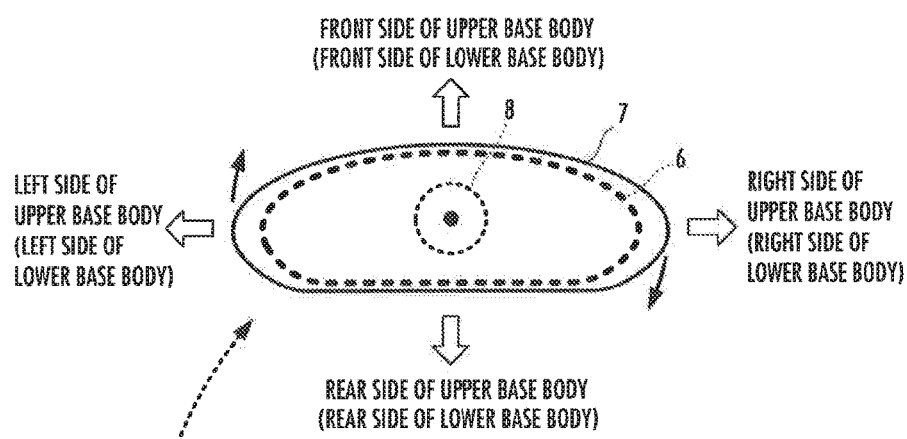
FIG. 2A is a diagram illustrating a state in which the front side of an upper base body of the mobile robot according to the embodiment is oriented to face the same direction as the front side of a lower base body.
Figure 2B:
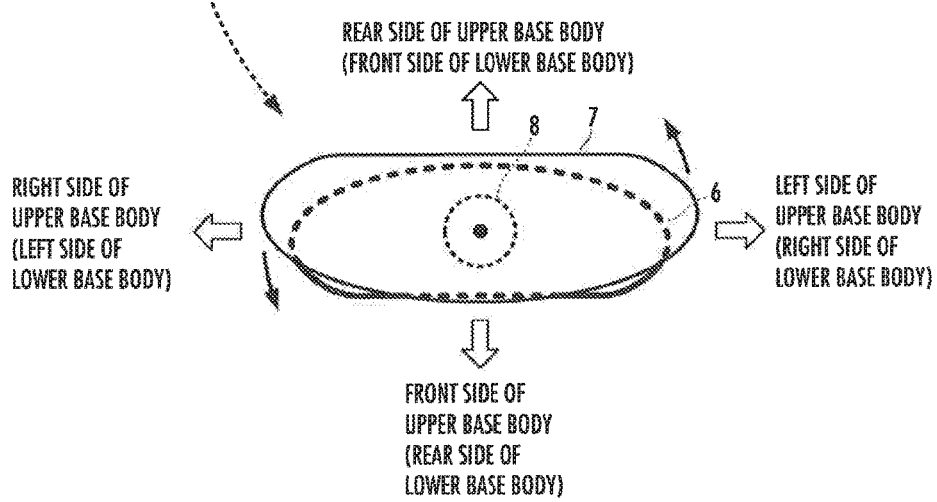
FIG. 2B is a diagram illustrating a state in which the front side of the upper base body of the mobile robot according to the embodiment is oriented to face the same direction as the rear side of the lower base body.

Hence, the rotation of the base body assembly 2 about the yaw axis of the joint mechanism part 8 enables the base body assembly 2 to be moved such that the front side of the upper base body 7 is oriented to face the same direction as the front side of the lower base body 6, as illustrated in FIG. 2A (hereinafter referred to as "the standard base body twist state") and that the front side of the upper base body 7 is oriented to face the same direction as the rear side of the lower base body 6, as illustrated in FIG. 2B (hereinafter referred to as "the reverse base body twist state"). The base body assembly 2 of the robot 1 illustrated in FIG. 1 is in the standard base body twist state.

The leg links 3R, 3L are extended from the lower base body 6 of the base body assembly 2. More specifically, the right leg link 3R is extended from a right bottom portion of the lower base body 6, and the left leg link 3L is extended from a left bottom portion of the lower base body 6. The right side and the left side of the leg links 3R and 3L mean the right side and the left side as observed facing the front of the lower base body 6.

Each of the leg links 3 is constituted of element links corresponding to a thigh 11, a crus 12, and a foot 13, which are connected through the intermediary of a hip joint mechanism part 14, a knee joint mechanism part 15, and an ankle joint mechanism part 16 in this order from the base body assembly 2 side.

Further, the joint mechanism parts 14, 15 and 16 between the foot 13, which is the distal end portion of each of the leg links 3, and the base body assembly 2 are configured such that the foot 13 of each of the leg links 3 moves at, for example, six degrees of freedom of motion with respect to the base body assembly 2 in the present embodiment.

For example, the hip joint mechanism part 14 is composed of three joints (not illustrated) so as to have a degree of freedom of rotation about a total of three axes, namely, the yaw axis, the pitch axis and the roll axis. The knee joint mechanism part 15 is composed of a single joint (not illustrated) so as to have a degree of freedom of rotation about a single axis, e.g., the pitch axis. The ankle joint mechanism part 16 is composed of two joints (not illustrated) so as to have a degree of freedom of rotation about a total of two axes, namely, for example, the pitch axis and the roll axis.

Figure 4:
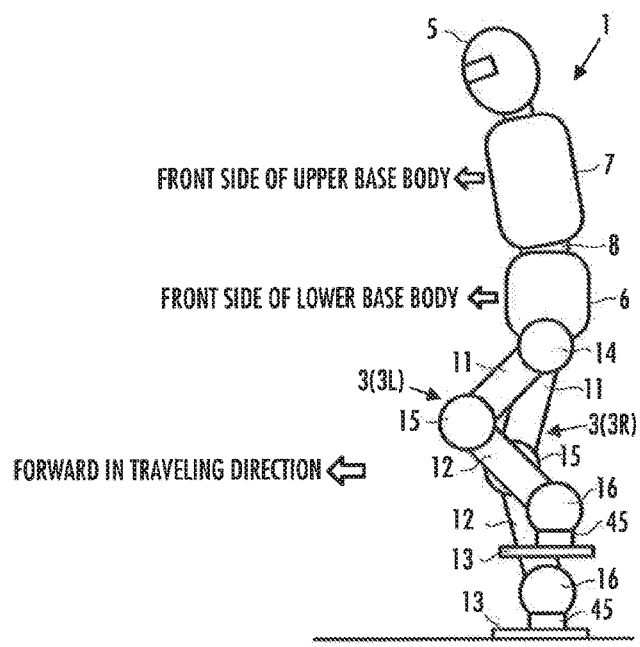
FIG. 4 is a diagram illustrating a state in which the mobile robot according to the embodiment is instructed to travel in the mode of a first travel motion.
Figure 5:
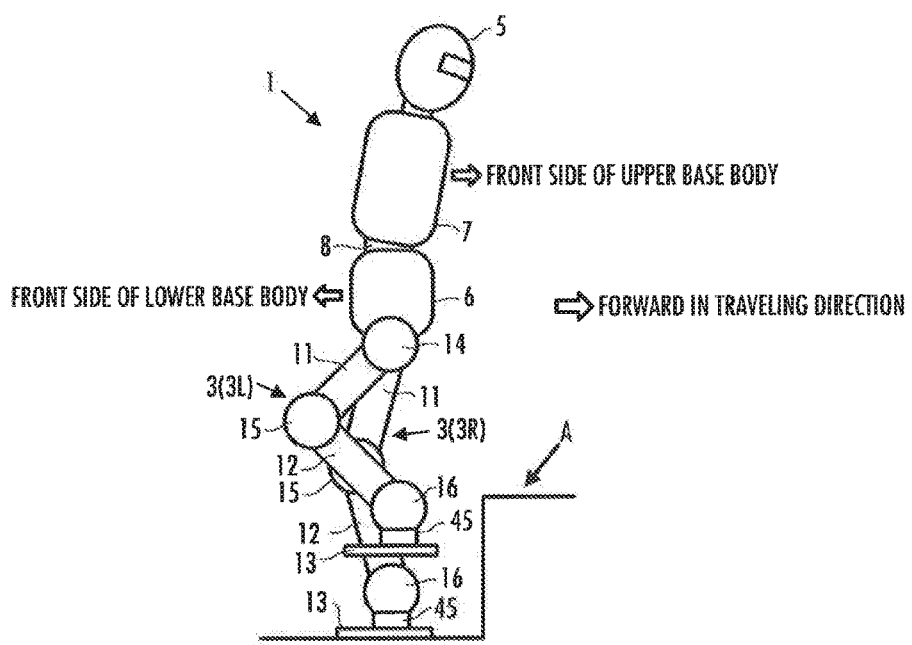
FIG. 5 is a diagram illustrating a state in which the mobile robot according to the embodiment is instructed to travel in the mode of a second travel motion.

In this case, in each of the leg links 3, the motion of a joint of the hip joint mechanism part 14 (the rotation about the pitch axis) and the motion of the joint of the knee joint mechanism part 15 (the rotation about the pitch axis) enable the knee, which is a middle portion of each of the leg links 3, to bend to jut out toward either the front side or the rear side of the lower base body 6, as illustrated in FIG. 4 or FIG. 5, which illustrates an example in which the knee juts out toward the front side.

The arm links 4R, 4L are extended from the upper base body 7 of the base body assembly 2. More specifically, the right arm link 4R is extended from a right upper portion of the upper base body 7, and the left arm link 4L is extended from a left upper portion of the upper base body 7.

The right side and the left side of the arm links 4R and 4L mean the right side and the left side as observed facing the front of the upper base body 7. Hence, in a state in which the front side of the upper base body 7 is oriented to face the same direction as the front side of the lower base body 6, the arm link 4R on the right side and the arm link 4L on the left side are positioned on the right side and the left side, respectively, as observed facing the front of the lower base body 6. Meanwhile, in a state in which the front side of the upper base body 7 is oriented to face the same direction as the rear side of the lower base body 6, the arm link 4R on the right side and the arm link 4L on the left side are positioned on the left side and the right side, respectively, as observed facing the front of the lower base body 6.

Each of the arm links 4 is comprised of element links corresponding to an upper arm 21, a forearm 22, and a hand 23, which are connected through the intermediary of a shoulder joint mechanism part 24, an elbow joint mechanism part 25, and a wrist joint mechanism part 26 in this order from the base body assembly 2 side.

Further, the joint mechanism parts 24, 25 and 26 located between the hand 23, which is the distal end portion, of each of the arm links 4 and the base body assembly 2 are configured such that the hand 23 of each of the arm links 4 moves with, for example, eight degrees of freedom of motion with respect to the base body assembly 2 in the present embodiment.

For example, the shoulder joint mechanism part 24 is composed of four joints (not illustrated) so as to have a degree of freedom of rotation about a total of four axes, namely, two yaw axes, the pitch axis and the roll axis. The elbow joint mechanism part 25 is composed of a single joint (not illustrated) so as to have a degree of freedom of rotation about a single axis (e.g., the pitch axis or the roll axis). The wrist joint mechanism part 26 is composed of three joints (not illustrated) so as to have a degree of freedom of rotation about a total of three axes, namely, for example, the yaw axis, the pitch axis and the roll axis.

Further, the hands 23 of the arm links 4 in the present embodiment are configured to be capable of grasping an object. For example, each of the hands 23 is composed of an appropriate clamp mechanism (e.g., an opening and closing mechanism formed of a single-axis joint) or a finger mechanism or the like with a plurality of joints capable of performing motions which are similar to those of human fingers.

The head 5 is attached to the upper end of the base body assembly 2 through the intermediary of a neck joint mechanism part 31. The neck joint mechanism part 31 is composed of one or two or three joints so as to have a degree of freedom of rotation about, for example, one axis, two axes or three axes.

Supplementarily, each of the leg links 3 may be configured to have a degree of freedom of motion that is larger than, for example, six degrees of freedom. Further, each of the arm links 4 may be configured to have a degree of freedom of motion that is, for example, smaller than eight degrees of freedom or a degree of freedom of motion that is larger than eight degrees of freedom.

Further, the joint mechanism part 8 of the base body assembly 2 may be configured to have a degree of freedom of rotation about, for example, three axes or a degree of freedom of rotation about a single axis, namely, only the yaw axis. Further, each of the leg links 3 and the arm links 4 or the base body assembly 2 may include linear motion type joints rather than being limited to rotary type joints.

Further, the hands 23 may be configured not to have the function for grasping an object.

Further, the robot 1 may be configured not to have the head 5 and the neck joint mechanism part 31.

The above has outlined the mechanical structure of the robot 1 according to the present embodiment.

A description will now be given of the configuration for controlling the motion of the robot 1.

Figure 3:
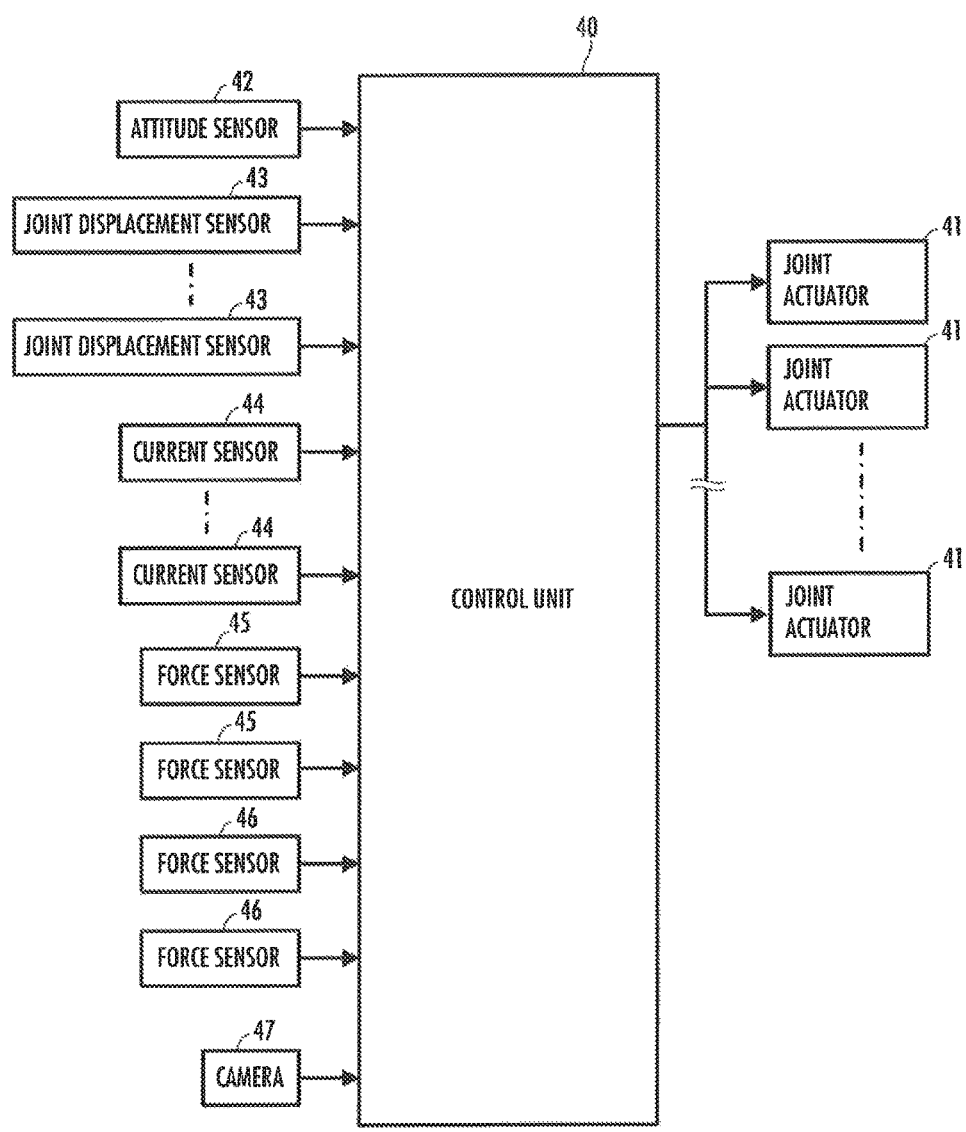
FIG. 3 is a block diagram illustrating the configuration related to the control of the mobile robot according to the embodiment.

As illustrated in FIG. 3, the robot 1 includes a control unit 40 for controlling the motion of the robot 1, joint actuators 41 for driving the individual joints, and various types of necessary sensors.

Each of the joint actuators 41 is provided for each joint. Each of the joint actuators 41 transmits a driving force to a corresponding joint through the intermediary of a reduction gear or the like (not illustrated) thereby to drive the joint. The joint actuators 41 are composed of electric motors in the present embodiment. The joint actuators 41 include actuators for driving the hands 23.

The robot 1 incorporates, as sensors, an attitude sensor 42 for detecting the attitude (the spatial orientation) of one of the lower base body 6 and the upper base body 7 of the robot 1, e.g., the attitude of the lower base body 6, joint displacement sensors 43 for detecting the amounts of displacement (the rotational angle) of the joints of the robot 1, current sensors 44 for detecting the energizing currents of the joint actuators (the electric motors) 41, force sensors 45 for detecting external forces (translational forces and moments) received by the foot 13 of each of the leg links 3 from an object with which the foot 13 comes in contact, force sensors 46 for detecting external forces (translational forces and moments) received by the hand 23 of each of the arm links 4 from an object with which the hand 23 comes in contact, and a camera 47 serving as an external world condition observation instrument for observing the external world condition on the front side of the upper base body 7.

The attitude sensor 42 is a sensor installed to the lower base body 6 such that the attitude (the spatial orientation) of the lower base body 6 can be detected by, for example, a strapdown method. The attitude sensor 42 is comprised of a gyro sensor, which detects three-axis angular velocities, and an acceleration sensor, which detects three-axis translational accelerations.

Each of the joint displacement sensors 43 is provided for each element joint. Each of the joint displacement sensors 43 is comprised of a rotational angle sensor, such as a rotary encoder or a potentiometer.

Each of the current sensors 44 is provided in an energization path of a coil of the electric motor constituting each of the joint actuators 41.

Each of the force sensors 45 is provided for each of the leg links 3. Each of the force sensors 45 is comprised of, for example, a six-axis force sensor interposed between the ankle joint mechanism part 16 and the foot 13 of each of the leg links 3, as illustrated in FIG. 1. Further, each of the force sensors 46 is provided for each of the arm links 4. Each of the force sensors 46 is comprised of, for example, a six-axis force sensor interposed between the wrist joint mechanism part 26 and the hand 23 of each of the arm links 4, as illustrated in FIG. 1.

The camera 47 is mounted on, for example, the head 5 so as to be capable of imaging an area on the front side of the upper base body 7.

The camera 47 may alternatively be mounted on the upper base body 7. Further alternatively, a distance measurement sensor (a laser type distance measurement sensor or the like), which is capable of detecting the distance between each part of an external world object lying on the front side of the upper base body 7 and the robot 1, may be installed to the head 5 or the upper base body 7 of the robot 1 as an external world condition observation instrument in place of the camera 47 or in addition to the camera 47.

Further, the robot 1 may be provided with sensors (e.g., sensors for the measurement of an external world environment) other than the sensors described above.

The control unit 40 is constituted of an electronic circuit unit, which includes a CPU, a RAM, a ROM, an interface circuit and the like. The control unit 40 receives the detection signals from the foregoing sensors.

The control unit 40 has a function implemented by executing an installed program or a function implemented by a hardware configuration to control the motions of the joints of the robot 1 through the joint actuators 41 according to, for example, motion commands (commands that specify how the robot 1 should travel or perform a task) given as necessary from an external server or the like, motion commands taught in advance, sensed information on an external world provided through the camera 47 or the like, or map information on an external world stored and retained in advance.

In this case, the control unit 40 selects the mode of the travel motion of the robot 1 according to the motion commands, the sensed information on an external world, the map information or the like in a situation in which the robot 1 is expected to travel.

Further, the control unit 40 generates a trajectory, which is the time series of instantaneous values, of a control target, such as a desired amount of displacement, of each joint of the robot 1 and sequentially controls the joint actuators 41 corresponding to the individual joints according to the control targets such that the robot 1 travels in the selected mode.

In the present embodiment, the modes of the travel motions of the robot 1 are roughly divided into four types. A first mode is a first travel motion mode in which the robot 1 travels in the direction of the front side of the upper base body 7, i.e., the front side of the lower base body 6, by a motion (walking motion), in which the distal end portion, i.e., the foot 13, of each of the leg links 3R, 3L is lifted off and then landed following the lifting off in a state in which the front side of the upper base body 7 is oriented to face the same direction as the front side of the lower base body 6 (the standard base body twist state). FIG. 4 illustrates the instantaneous attitude of the robot 1 in the first travel motion. In FIG. 4, the illustration of the arm links 4R, 4L is omitted.

A second mode is a second travel motion mode in which the robot 1 travels in the direction of the front side of the upper base body 7, i.e., the rear side of the lower base body 6, by a motion (walking motion), in which the distal end portion, i.e., the foot 13, of each of the leg links 3R, 3L is lifted off and then landed following the lifting off in a state in which the front side of the upper base body 7 is oriented to face the same direction as the rear side of the lower base body 6 (the reverse base body twist state). FIG. 5 illustrates the instantaneous attitude of the robot 1 in the second travel motion. In FIG. 5, the illustration of the arm links 4R, 4L is omitted.

More specifically, in the first travel motion and the second travel motion, the motion, in which the distal end portion of one of the leg links 3R, 3L is lifted off with the distal end portion of the other leg link held in contact with the ground (i.e., with the other leg link set as a supporting leg) and then landed (i.e., the one leg link is moved as a free leg), is repeated. In this case, the leg links 3R, 3L alternately act as the free leg. Further, the arm links 4R, 4L are set in a non-ground-contact state.

However, the first travel motion and the second travel motion may include a state in which the distal end portions of both the leg links 3R, 3L are lifted off.

Figure 6:
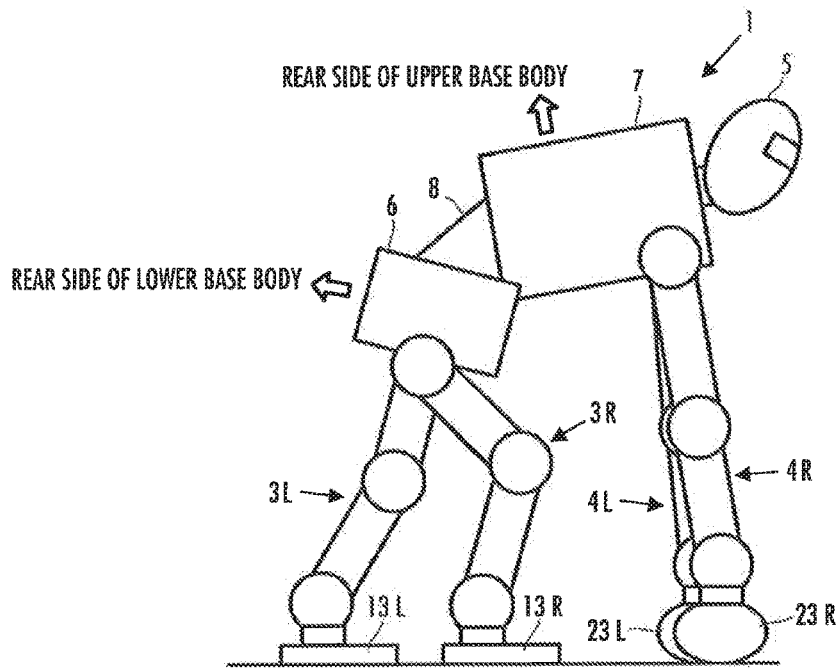
FIG. 6 is a diagram illustrating a state in which the mobile robot according to the embodiment is instructed to travel in the mode of a third travel motion.

A third mode is a third travel motion mode in which the robot 1 travels by a motion in which the distal end portions, i.e., the foot 13 and the hand 23, of each of the leg links 3R, 3L and the arm links 4R, 4L, respectively, are lifted off and then landed following the lifting off in a state in which the front side of the upper base body 7 is oriented to face the same direction as the front side of the lower base body 6 (the standard base body twist state). FIG. 6 illustrates the instantaneous attitude of the robot 1 in the third travel motion.

Figure 7:
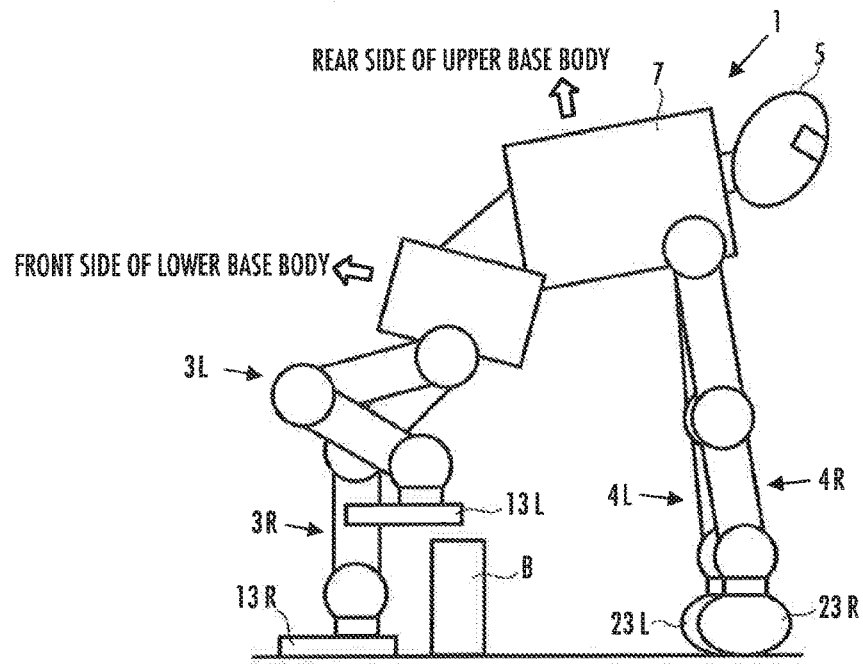
FIG. 7 is a diagram illustrating a state in which the mobile robot according to the embodiment is instructed to travel in the mode of a fourth travel motion.

A fourth mode is a fourth travel motion mode in which the robot 1 travels by a motion in which the distal end portions (i.e., the foot 13 and the hand 23) of each of the leg links 3R, 3L and the arm links 4R, 4L, respectively, are lifted off and then landed following the lifting off in a state in which the front side of the upper base body 7 is oriented to face the same direction as the rear side of the lower base body 6 (the reverse base body twist state). FIG. 7 illustrates the instantaneous attitude of the robot 1 in the fourth travel motion.

More specifically, in the third travel motion and the fourth travel motion according to the present embodiment described above, a motion in which the distal end portions of two or three movable links among the leg links 3R, 3L and the arm links 4R, 4L are held in contact with the ground (i.e., a state in which the two or three movable links are operated as the supporting legs) and the distal end portions or portion of the remaining two movable links or one movable link is lifted off and then landed (i.e., the remaining two movable links or one movable link is operated as a free leg) is repeated. In this case, the movable links operated as the free legs are periodically changed according to a predetermined rule.

Alternatively, in the third travel motion and the fourth travel motion, it is also possible to repeat a motion in which the distal end portion of one movable link among the leg links 3R, 3L and the arm links 4R, 4L is held in contact with the ground (i.e., a state in which the single movable link is operated as the supporting leg) and the distal end portions of the remaining three movable links are lifted off and then landed (i.e., the remaining three movable links are operated as free legs).

Further alternatively, in the third travel motion and the fourth travel motion, it is also possible to repeat a motion in which the distal end portions of all the movable links, namely, the leg links 3R, 3L and the arm links 4R, 4L, are lifted off at the same time (i.e., causing the robot 1 to jump) and then landed.

Supplementarily, in the first to the fourth travel motions described above, bringing the distal end portions of the leg links 3 or the arm links 4 into contact with the ground means to bring the distal end portions into contact with an external world object so as to be subjected to a contact reaction force against the gravitational force acting on the robot 1.

The travel motion of the robot 1 according to the present embodiment will now be described more specifically.

To perform the travel of the robot 1, the control unit 40 selects the mode of the travel motion according to a motion command, the sensed information on an external world, the map information on an external world or the like described above.

At this time, in a situation wherein it is determined that, for example, there is a space that allows the robot 1 to stand up with the two leg links 3R, 3L and enables the robot 1 to travel in the first travel motion without causing interference or the like between the leg links 3 of the robot 1 and an external world object (the situation including a case where it is determined that, if the robot 1 travels in the second travel motion, then an interference between one of the leg links 3 and an external world object or the like will occur), the first travel motion is selected as the travel motion mode for the robot 1.

For example, as illustrated in FIG. 4, in a situation wherein the floor surface or the ground surface in an environment in which the robot 1 is to travel is relatively flat, the first travel motion mode is selected as the travel motion mode for the robot 1. In this situation, the second travel motion mode may alternatively be selected as the travel motion mode for the robot 1.

Further, in a situation wherein, for example, it is determined that, although there is a space that allows the robot 1 to stand up with the two leg links 3R, 3L, if the robot 1 travels in the first travel motion mode, the interference between one of the leg links 3 and an external world object will occur, the second travel motion mode is selected as the travel motion mode for the robot 1.

For example, as illustrated in FIG. 5, when the robot 1 is to be instructed to climb up a relatively high step A, the second travel motion mode is selected as the travel motion mode for the robot 1.

Further, the third travel motion mode is selected as the travel motion mode for the robot 1 in a situation wherein, for example, it is determined that there is not a space that allows the robot 1 to stand up due to a low ceiling or the like in an environment wherein the robot 1 is to travel and that the third travel motion will enable the robot 1 to travel without causing the interference or the like between the leg links 3 of the robot 1 and an external world object or the base body assembly 2 (the situation in this case including a situation wherein it is determined that if the robot 1 travels in the fourth travel motion mode, then the interference between one of the leg links 3 and an external world object or the like will occur).

In a situation wherein, for example, there is not a space that allows the robot 1 to stand up and the floor surface or the ground surface in an environment in which the robot 1 is to travel is relatively flat, as illustrated in FIG. 6, the third travel motion mode is selected as the travel motion mode for the robot 1. In this situation, the fourth travel motion mode may alternatively be selected as the travel motion mode for the robot 1.

Further, the fourth travel motion mode is selected as the travel motion mode for the robot 1 in a situation wherein, for example, it is determined that there is not a space that allows the robot 1 to stand up due to a low ceiling or the like in an environment wherein the robot 1 is to travel and that if the robot 1 travels in the third travel motion mode, then the interference between one of the leg links 3 and an external world object or the base body assembly 2 will occur.

The fourth travel motion mode is selected as the travel motion mode for the robot 1 in a situation wherein, for example, there is not a space that allows the robot 1 to stand up and a relatively tall projection B or a piping or the like, which is to be ridden over by the robot 1, lies on a floor surface or a ground surface in an environment in which the robot 1 is to travel, as illustrated in FIG. 7.

Figure 8:
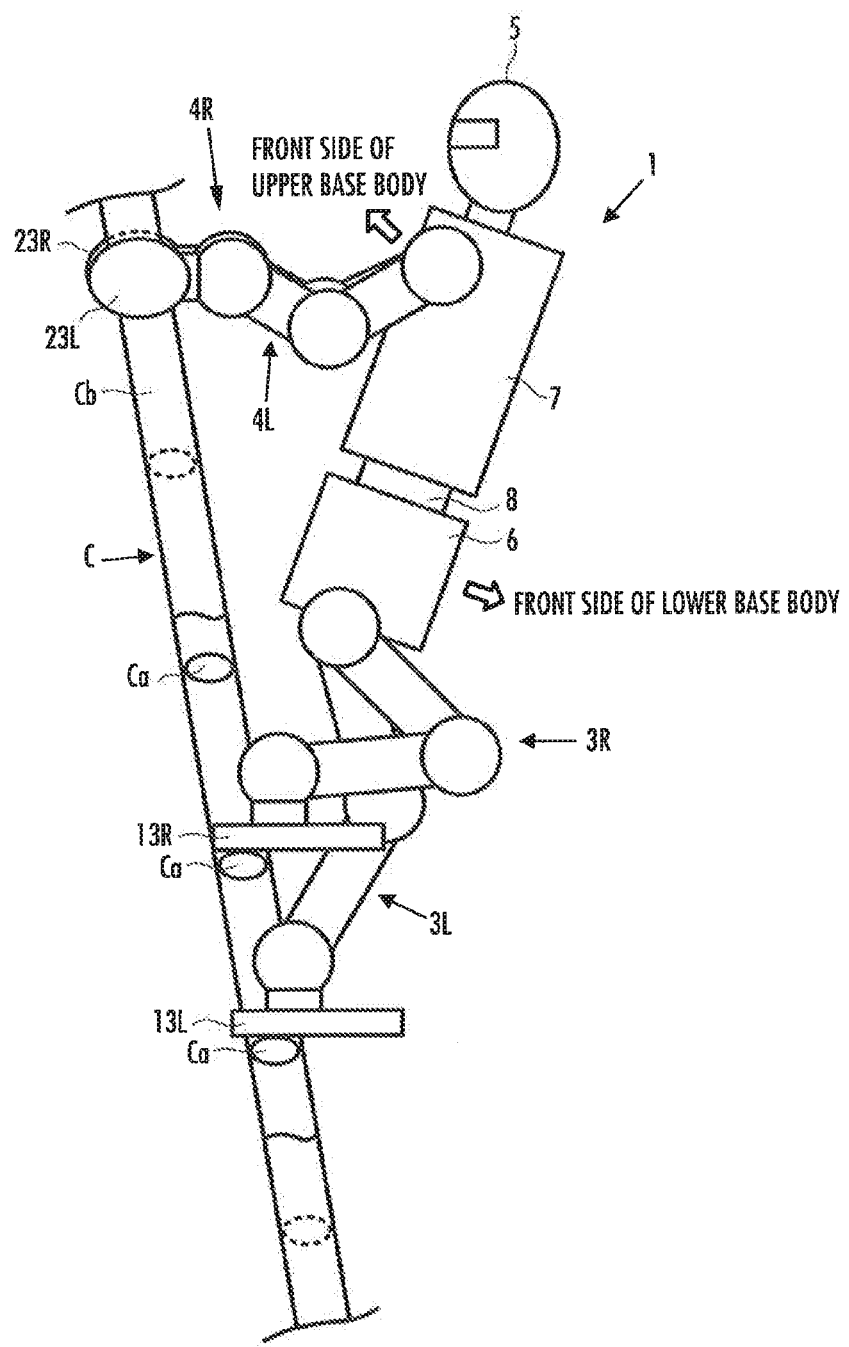
FIG. 8 is a diagram illustrating a state in which the mobile robot according to the embodiment is instructed to climb up and down a ladder.

In a situation wherein the robot 1 is to be instructed to climb up or down a structure with a steep slope, such as a ladder C, as illustrated in FIG. 8, if the robot 1 climbs up or down in the third travel motion mode, then the leg links 3 may interfere with rungs Ca or the like of the ladder C. In such a case, the fourth travel motion mode is selected as the travel motion mode for the robot 1. A component denoted by a reference character Cb in FIG. 8 is a support strut of the ladder C.

Supplementarily, if it is possible for the robot 1 to travel in a plurality of modes among the first to the fourth travel motions, then any one of the plurality of modes may be selected. In this case, the travel motion mode to be selected can be determined according to, for example, a predetermined order or priority, the motion state of the robot 1 immediately before the selection, or the type of a task to be performed by the robot 1 at a destination.

The control unit 40 generates the trajectories of the control targets of the joints of the robot 1 so as to perform the travel of the robot 1 in a selected travel motion mode. Then, the control unit 40 controls the joint actuators 41 that correspond to the individual joints according to the control targets.

The following will describe in more detail the processing of controlling the robot 1 in each of the first to the fourth travel motion modes.

[First Travel Motion]

Figure 9A:
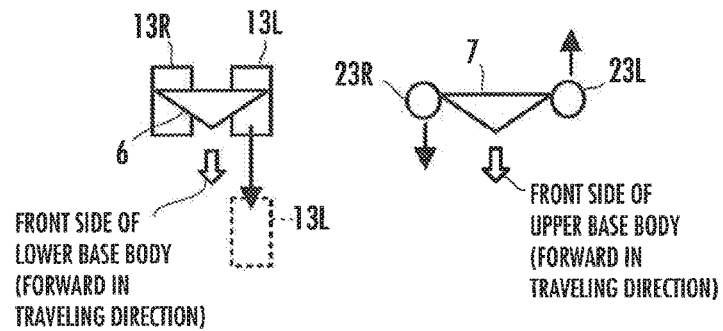
FIG. 9A, FIG. 9B and FIG. 9C are diagrams illustrating the motions of leg links and arm links in order when the mobile robot according to the embodiment is instructed to travel in the mode of the first travel motion.
Figure 9B:
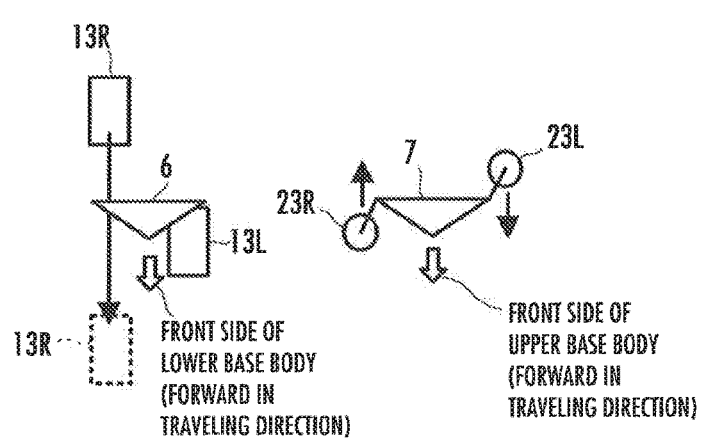
Figure 9C:
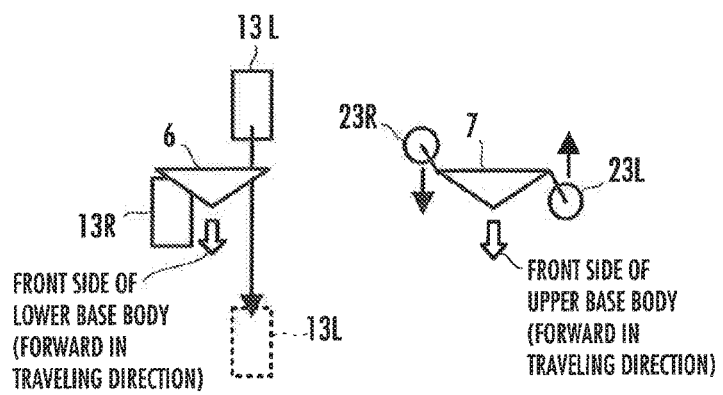

If the first travel motion mode is selected as the travel motion mode for the robot 1, then the control unit 40 generates the trajectories of the desired position and attitude of each of the feet 13 such that a motion is performed, in which the feet 13R, 13L of the leg links 3R, 3L, respectively, are alternately lifted off forward in the traveling direction of the robot 1 (i.e., in the direction of the front side of the lower base body 6, which means the direction of the front side of the upper base body 7) and then landed, as illustrated in the diagrams on the left side of FIG. 9A to FIG. 9C, with the base body assembly 2 being set in the standard base body twist state.

In the description of the present embodiment, the desired position and attitude of any portion of the robot 1, such as the foot 13, means a set of a desired position of a representative point of the portion and a desired attitude of the portion, i.e., a desired spatial orientation.

Further, the control unit 40 generates the trajectories of the relative desired position and attitude of each of the hands 23 with respect to the upper base body 7 such that, when the foot 13L of the left leg link 3L is lifted off forward in the traveling direction of the robot 1 (the situations illustrated in FIG. 9A and FIG. 9C), the hand 23R of the right arm link 4R and the hand 23L of the left arm link 4L are moved accordingly toward the front side and the rear side, respectively, of the upper base body 7, and that when the foot 13R of the right leg link 3R is lifted off forward in the traveling direction of the robot 1 (the situations illustrated in FIG. 9B), the hand 23R of the right arm link 4R and the hand 23L of the left arm link 4L are moved accordingly toward the rear side and the front side, respectively, of the upper base body 7 as illustrated in the diagrams on the right side of FIG. 9A to FIG. 9C.

The arm links 4R, 4L are moved as described above to restrain the robot 1 from spinning, i.e. the rotation in the direction about the yaw axis, by canceling the moment in the direction about the yaw axis, which is generated due to an inertial force from the lifting off or swing of the foot 13 of the leg link 3R or 3L, by the motions of the arm links 4R, 4L.

Then, the control unit 40 sets a desired trajectory of a zero moment point (ZMP) according to the trajectories of the desired position and attitude of each of the feet 13. The control unit 40 further generates the trajectories of the desired position and attitude of the lower base body 6 or the upper base body 7 by using an appropriate dynamic model so as to achieve the desired trajectory of the ZMP.

Further, the control unit 40 generates the trajectory of the desired amount of displacement as the control target of each joint of the robot 1 according to a technique, such as the resolved momentum control, by using the trajectories of the desired position and attitude of each of the feet 13 and the hands 23 and the trajectories of the desired position and attitude of the lower base body 6 or the upper base body 7.

Then, the control unit 40 controls the joint actuators 41 that correspond to the individual joints so as to move the joints according to the trajectories of the desired amounts of displacement.

[Second Travel Motion]

Figure 10A:
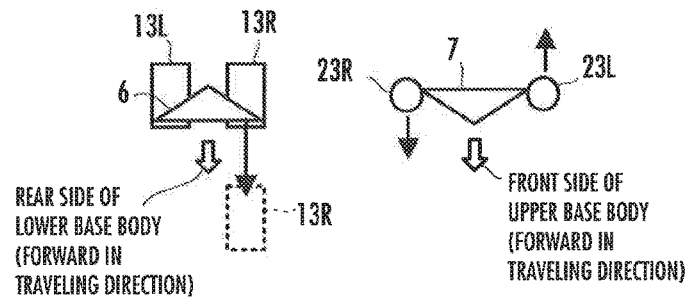
FIG. 10A, FIG. 10B and FIG. 10C are diagrams illustrating the motions of the leg links and the arm links in order when the mobile robot according to the embodiment is instructed to travel in the mode of the second travel motion.
Figure 10B:
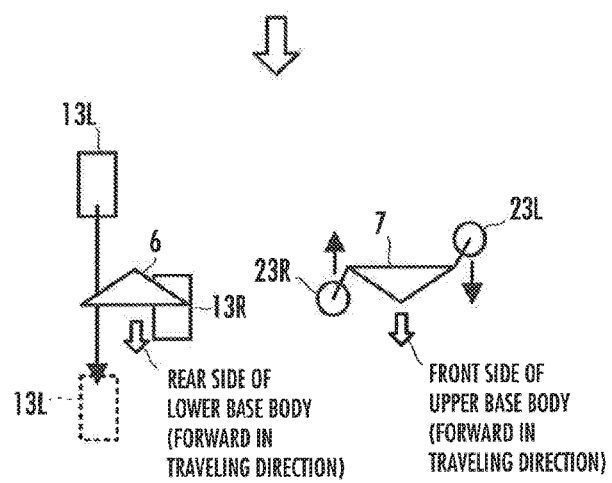
Figure 10C:
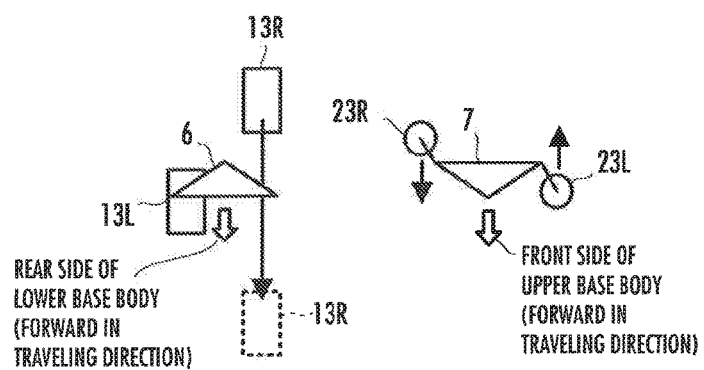

If the second travel motion mode is selected as the travel motion mode for the robot 1, then the control unit 40 generates the trajectories of the desired position and attitude of each of the feet 13 such that a motion is performed, in which the feet 13R, 13L of the leg links 3R, 3L, respectively, are alternately lifted off forward in the traveling direction of the robot 1 (i.e., in the direction of the rear side of the lower base body 6, which means the direction of the front side of the upper base body 7) and then landed, as illustrated in the diagrams on the left side of FIG. 10A to FIG. 10C, in the state in which the base body assembly 2 is set to the reverse base body twist state.

Further, the control unit 40 generates the trajectories of the relative desired position and attitude of each of the hands 23 with respect to the upper base body 7 such that, when the foot 13R of the right leg link 3R is lifted off forward in the traveling direction of the robot 1 (the situations illustrated in FIG. 10A and FIG. 10C), the hand 23R of the right arm link 4R and the hand 23L of the left arm link 4L are moved accordingly toward the front side and the rear side, respectively, of the upper base body 7 and that, when the foot 13L of the left leg link 3L is lifted off forward in the traveling direction of the robot 1 (the situation illustrated in FIG. 10B), the hand 23R of the right arm link 4R and the hand 23L of the left arm link 4L are moved accordingly toward the rear side and the front side, respectively, of the upper base body 7, as illustrated in the diagrams on the right side of FIG. 10A to FIG. 10C.

Thus, the comparison between the first travel motion and the second travel motion in the motion pattern of the movements of the left and right arm links 4L, 4R based on the movements of the left and right leg links 3L, 3R indicates that the second travel motion is carried out such that the motion pattern of the right arm link 4R based on the motions of the left and right leg links 3L, 3R in the second travel motion coincides with the motion pattern of the left arm link 4L based on the motions of the left and right leg links 3L, 3R in the first travel motion, and the motion pattern of the left arm link 4L based on the motions of the left and right leg links 3L, 3R in the second travel motion coincides with the motion pattern of the right arm link 4R based on the motions of the left and right leg links 3L, 3R in the first travel motion.

The motion pattern of the right arm link 4R based on the motions of the left and right leg links 3L, 3R is, more specifically, a motion pattern that defines the direction in which the distal end portion (the hand 23) of the right arm link 4R is moved at the timing at which the distal end portions (the feet 13) of the left and right leg links 3L, 3R are moved forward in the traveling direction. Similarly, the motion pattern of the left arm link 4L based on the motions of the left and right leg links 3L, 3R is, more specifically, a motion pattern that defines the direction in which the distal end portion (the hand 23) of the left arm link 4L is moved at the timing at which the distal end portions (the feet 13) of the left and right leg links 3L, 3R are moved forward in the traveling direction.

Further, in the case where the robot 1 travels in the second travel motion mode, the control unit 40 generates the trajectories of the desired position and attitude of the lower base body 6 or the upper base body 7 so as to achieve the desired trajectory of the ZMP set according to the trajectories of the desired position and attitude of each of the feet 13, as with the case of the first travel motion.

Further, the control unit 40 generates the trajectory of the desired amount of displacement of each joint of the robot 1 according to a technique, such as the resolved momentum control, by using the trajectories of the desired positions and attitudes of the feet 13 and the hands 23 and the trajectories of the desired position and attitude of the lower base body 6 or the upper base body 7, as with the case of the first travel motion.

Then, the control unit 40 controls the joint actuators 41 that correspond to the individual joints so as to move the joints according to the trajectories of the desired amounts of displacement.

[Third Travel Motion and Fourth Travel Motion]

If the third travel motion mode or the fourth travel motion mode is selected as the travel motion mode for the robot 1, the control unit 40 sets the base body assembly 2 in the standard base body twist state in the case of the third travel motion or in the reverse base body twist state in the case of the fourth travel motion, and controls the joint actuators 41 such that the robot 1 travels in one of a crawl mode, a pacing mode or a trot mode from the state in which the distal end portions, namely, the feet 13R and 13L of the two leg links 3R and 3L, respectively, and the distal end portions, namely, the hands 23R and 23L of the two arm links 4R and 4L, respectively, are in contact with the ground.

In this case, whether the third travel motion or the fourth travel motion should be carried out in the crawl mode, the pacing mode or the trot mode is determined according to, for example, the travel speed required of the robot 1 or the required level of the attitude stability of the robot 1.

In a situation wherein, for example, the need for securing the attitude stability of the robot 1 is high, the crawl mode is selected, in which the distal end portion of one movable link among the two leg links 3R, 3L and the two arm links 4R, 4L is lifted off while the distal end portions of the remaining three movable links are held in contact with the ground.

Further, in a situation wherein, for example, the need for the robot 1 to quickly travel is high, the pacing mode or the trot mode is selected, in which the distal end portions of two movable links among the two leg links 3R, 3L and the two arm links 4R, 4L are in contact with the ground and the distal end portions of the remaining two movable links are lifted off.

In the pacing mode, among the distal end portions of the four movable links, the distal end portions of the two movable links on the right or the left as observed facing the traveling direction of the robot 1 are lifted off. In the trot mode, among the distal end portions of the four movable links, the distal end portions of two movable links in a diagonal direction are lifted off. To enhance the attitude stability of the robot 1, the trot mode is more advantageous than the pacing mode.

Hereinafter, the third travel motion and the fourth travel motion in the crawl mode will be referred to as the crawl mode third travel motion and the crawl mode fourth travel motion, the third travel motion and the fourth travel motion in the pacing mode will be referred to as the pacing mode third travel motion and the pacing mode fourth travel motion, and the third travel motion and the fourth travel motion in the trot mode will be referred to as the trot mode third travel motion and the trot mode fourth travel motion.

Figure 11:
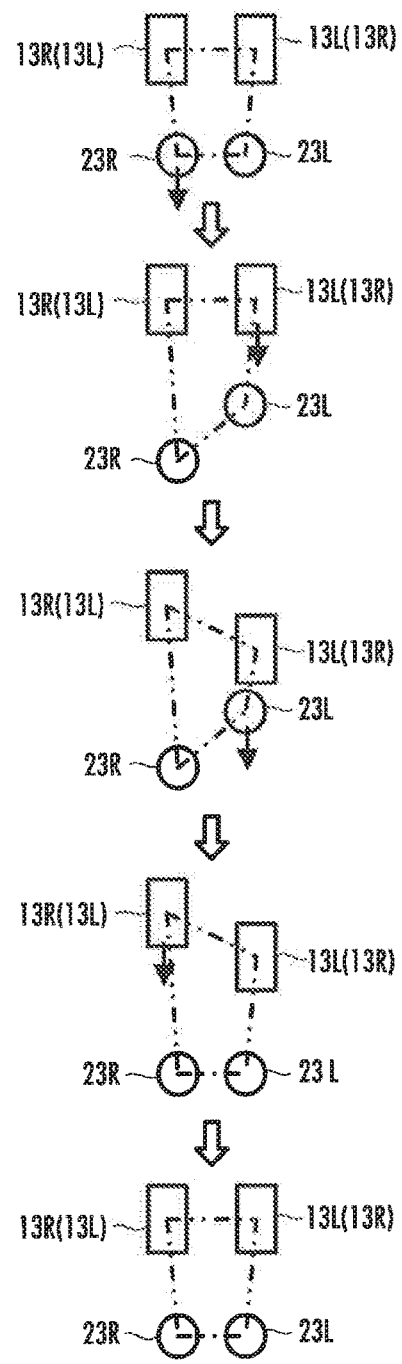
FIG. 11 is a diagram illustrating the motions of the leg links and the arm links in order when the mobile robot according to the embodiment is instructed to travel by the third travel motion or the fourth travel motion in a crawl mode.

To instruct the robot 1 to perform the crawl mode third travel motion or the crawl mode fourth travel motion, the control unit 40 generates the trajectories of the desired position and attitude of each of the feet 13 and the hands 23 such that the distal end portion (the foot 13 or the hand 23) of one movable link among the leg links 3R, 3L and the arm links 4R, 4L is lifted off forward in the traveling direction of the robot 1 and then landed and this motion is repeated for each of the four movable links in a predetermined order, as illustrated in FIG. 11.

Regarding the feet 13R, 13L of the leg links 3R, 3L in FIG. 11, the unparenthesized reference numerals are the reference numerals corresponding to the crawl mode third travel motion and the parenthesized reference numerals are the reference numerals corresponding to the crawl mode fourth travel motion.

In the illustrated example, according to the crawl mode third travel motion, the trajectories of the desired position and attitude of each of the feet 13 and the hands 23 are generated such that the movement of the hand 23R of the right arm link 4R, the movement of the foot 13L of the left leg link 3L, the movement of the hand 23L of the left arm link 4L, and the movement of the foot 13R of the right leg link 3R forward in the traveling direction of the robot 1 are repeated in this order.

Further, according to the crawl mode fourth travel motion, the trajectories of the desired position and attitude of each of the feet 13 and the hands 23 are generated such that the movement of the hand 23R of the right arm link 4R, the movement of the foot 13R of the right leg link 3R, the movement of the hand 23L of the left arm link 4L, and the movement of the foot 13L of the left leg link 3L forward in the traveling direction of the robot 1 are repeated in this order.

Thus, the comparison between the crawl mode third travel motion and the crawl mode fourth travel motion in the motion pattern of the movements of the left and right arm links 4L, 4R based on the movements of the left and right leg links 3L, 3R indicates that the crawl mode third travel motion and the crawl mode fourth travel motion are carried out such that the motion pattern of the left arm link 4L based on the motions of the left and right leg links 3L, 3R in the crawl mode third travel motion and the motion pattern of the right arm link 4R based on the motions of the left and right leg links 3L, 3R in the crawl mode fourth travel motion coincide with each other, and the motion pattern of the right arm link 4R based on the motions of the left and right leg links 3L, 3R in the crawl mode third travel motion and the motion pattern of the left arm link 4L based on the motions of the left and right leg links 3L, 3R in the crawl mode fourth travel motion coincide with each other.

More specifically, in the crawl mode third travel motion or the crawl mode fourth travel motion, the motion pattern of the right arm link 4R or the left arm link 4L based on the motions of the left and right leg links 3L, 3R is a motion pattern that defines the direction in which the distal end portion (the hand 23) of the right arm link 4R or the left arm link 4L is to be moved at a timing following or preceding the lifting off of the distal end portion (the foot 13) of the left leg link 3L or the right leg link 3R.

Supplementarily, the order for moving the distal end portions of the left and right leg links 3L, 3R and the left and right arm links 4L, 4R may be different from the one mentioned above.

Further, in the crawl mode third travel motion or the crawl mode fourth travel motion, the control unit 40 sets a desired trajectory of the zero moment point (ZMP) according to the trajectories of the desired positions and attitudes of the feet 13 and the hands 23. The control unit 40 further generates the trajectories of the desired position and attitude of the lower base body 6 or the upper base body 7 by using an appropriate dynamic model so as to achieve a desired trajectory of the ZMP.

Further, the control unit 40 generates the trajectory of a desired amount of displacement as the control target of each joint of the robot 1 according to a technique, such as the resolved momentum control, by using the trajectories of the desired position and attitude of each of the feet 13 and the hands 23 and the trajectories of the desired position and attitude of the lower base body 6 or the upper base body 7.

Then, the control unit 40 controls the joint actuators 41 that correspond to the individual joints so as to move the joints according to the trajectories of the desired amounts of displacement.

Figure 12:
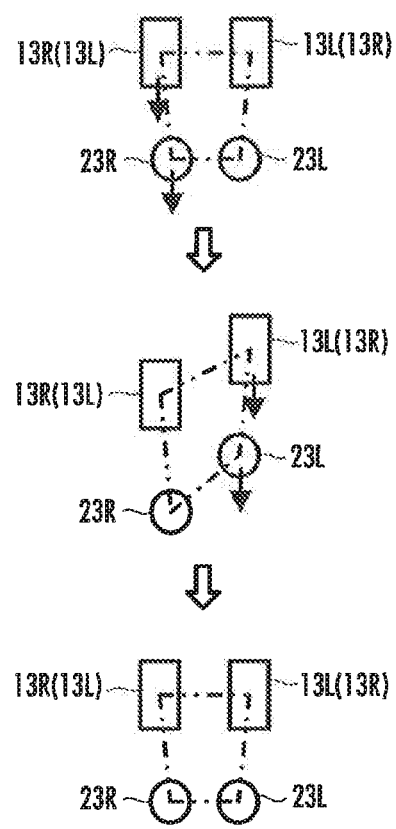
FIG. 12 is a diagram illustrating the motions of the leg links and the arm links in order when the mobile robot according to the embodiment is instructed to travel by the third travel motion or the fourth travel motion in a pacing mode.

Further, to instruct the robot 1 to perform the pacing mode third travel motion or the pacing mode fourth travel motion, the control unit 40 generates the trajectories of the desired position and attitude of each of the feet 13 and the hands 23 such that a motion, in which the distal end portions (the foot 13 and the hand 23) of two movable links on the right as observed facing forward in the traveling direction of the robot 1 among the leg links 3R, 3L and the arm links 4R, 4L are lifted off forward in the traveling direction of the robot 1 and then landed and that the distal end portions (the foot 13 and the hand 23) of the two movable links on the left as observed facing forward in the traveling direction of the robot 1 are lifted off forward in the traveling direction of the robot 1 and then landed, is repeated, as illustrated in FIG. 12.

Regarding the feet 13R, 13L of the leg links 3R, 3L in FIG. 12, the unparenthesized reference numerals are the reference numerals corresponding to the pacing mode third travel motion and the parenthesized reference numerals are the reference numerals corresponding to the pacing mode fourth travel motion.

In the example illustrated in FIG. 12, according to the pacing mode third travel motion, the trajectories of the desired position and attitude of each of the feet 13 and the hands 23 are generated such that the movement of the set of the foot 13R of the right leg link 3R and the hand 23R of the right arm link 4R and the movement of the set of the foot 13L of the left leg link 3L and the hand 23L of the left arm link 4L are alternately repeated.

Further, according to the pacing mode third travel motion, in which the base body assembly 2 is set to the standard base body twist state, the leg link 3R and the arm link 4R will be the leg link and the arm link, respectively, on the right side as observed facing forward in the traveling direction of the robot 1, and the leg link 3L and the arm link 4L will be the leg link and the arm link, respectively, on the left side as observed facing forward in the traveling direction of the robot 1.

Further, according to the pacing mode fourth travel motion, the trajectories of the desired position and attitude of each of the feet 13 and the hands 23 are generated such that the movement of the set of the foot 13L of the left leg link 3L and the hand 23R of the right arm link 4R and the movement of the set of the foot 13R of the right leg link 3R and the hand 23L of the left arm link 4L are alternately repeated.

Further, in the pacing mode fourth travel motion, in which the base body assembly 2 is set to the reverse base body twist state, the leg link 3L and the arm link 4R will be the leg link and the arm link, respectively, on the right side as observed facing forward in the traveling direction of the robot 1, and the leg link 3R and the arm link 4L will be the leg link and the arm link, respectively, on the left side as observed facing forward in the traveling direction of the robot 1.

Thus, the comparison between the pacing mode third travel motion and the pacing mode fourth travel motion in the motion pattern of the movements of the left and right arm links 4L, 4R based on the movements of the left and right leg links 3L, 3R indicates that the pacing mode third travel motion and the pacing mode fourth travel motion are carried out such that the motion pattern of the left arm link 4L based on the motions of the left and right leg links 3L, 3R in the pacing mode third travel motion and the motion pattern of the right arm link 4R based on the motions of the left and right leg links 3L, 3R in the pacing mode fourth travel motion coincide with each other, and the motion pattern of the right arm link 4R based on the motions of the left and right leg links 3L, 3R in the pacing mode third travel motion and the motion pattern of the left arm link 4L based on the motions of the left and right leg links 3L, 3R in the pacing mode fourth travel motion coincide with each other.

More specifically, in the pacing mode third travel motion and the pacing mode fourth travel motion, the motion pattern of the right arm link 4R or the left arm link 4L based on the motions of the left and right leg links 3L, 3R is a motion pattern that defines the direction in which the distal end portion (the hand 23) of the right arm link 4R or the left arm link 4L is to be moved at a timing at which the distal end portion (the foot 13) of the left leg link 3L or the right leg link 3R is lifted off.

Further, in the pacing mode third travel motion or the pacing mode fourth travel motion, the control unit 40 generates the trajectories of the desired position and attitude of the lower base body 6 or the upper base body 7 by using an appropriate dynamic model so as to achieve the desired trajectory of the ZMP set according to the trajectories of the desired position and attitude of each of the feet 13 and the hands 23, as in the case of the crawl mode.

Further, the control unit 40 generates the trajectory of a desired amount of displacement as the control target of each joint of the robot 1 according to a technique, such as the resolved momentum control, by using the trajectories of the desired position and attitude of each of the feet 13 and the hands 23 and the trajectories of the desired position and attitude of the lower base body 6 or the upper base body 7.

Then, the control unit 40 controls the joint actuators 41 that correspond to the individual joints so as to move the joints according to the trajectories of the desired amounts of displacement.

Figure 13:
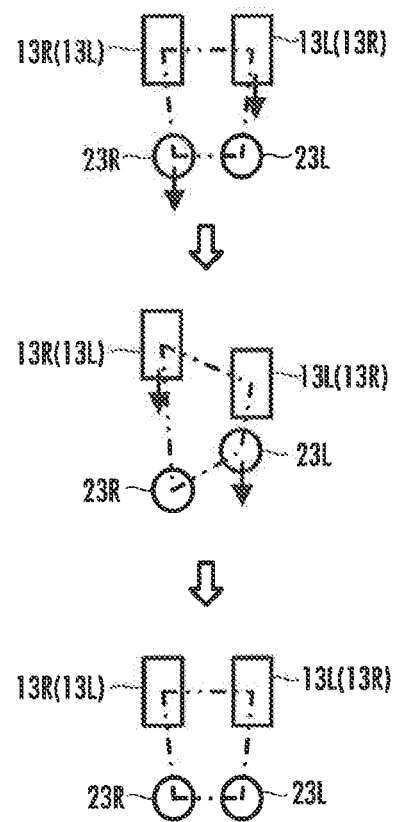
FIG. 13 is a diagram illustrating the motions of the leg links and the arm links in order when the mobile robot according to the embodiment is instructed to travel by the third travel motion or the fourth travel motion in a trot mode.

Further, to instruct the robot 1 to perform the trot mode third travel motion or the trot mode fourth travel motion, the control unit 40 generates the trajectories of the desired position and attitude of each of the feet 13 and the hands 23 such that a motion, in which the distal end portions (the foot 13 and the hand 23) of two movable links in the diagonal direction among the leg links 3R, 3L and the arm links 4R, 4L are lifted off forward in the traveling direction of the robot 1 and then landed, is repeated, as illustrated in FIG. 13.

Regarding the feet 13R, 13L of the leg links 3R, 3L in FIG. 13, the unparenthesized reference numerals are the reference numerals corresponding to the trot mode third travel motion and the parenthesized reference numerals are the reference numerals corresponding to the trot mode fourth travel motion.

In this case, in the example illustrated in FIG. 13, according to the trot mode third travel motion, the trajectories of the desired position and attitude of each of the feet 13 and the hands 23 are generated such that the movement of the set of the foot 13L of the left leg link 3L and the hand 23R of the right arm link 4R and the movement of the set of the foot 13R of the right leg link 3R and the hand 23L of the left arm link 4L are alternately repeated.

Further, according to the trot mode third travel motion, in which the base body assembly 2 is set to the standard base body twist state, the leg link 3R and the arm link 4R will be the leg link and the arm link, respectively, on the right side as observed facing forward in the traveling direction of the robot 1, and the leg link 3L and the arm link 4L will be the leg link and the arm link, respectively, on the left side as observed facing forward in the traveling direction of the robot 1.

Further, according to the trot mode fourth travel motion, the trajectories of the desired position and attitude of each of the feet 13 and the hands 23 are generated such that the movement of the set of the foot 13R of the right leg link 3R and the hand 23R of the right arm link 4R and the movement of the set of the foot 13L of the left leg link 3L and the hand 23L of the left arm link 4L are alternately repeated.

Further, in the trot mode fourth travel motion, in which the base body assembly 2 is set to the reverse base body twist state, the leg link 3L and the arm link 4R will be the leg link and the arm link, respectively, on the right side as observed facing forward in the traveling direction of the robot 1, and the leg link 3R and the arm link 4L will be the leg link and the arm link, respectively, on the left side as observed facing forward in the traveling direction of the robot 1.

Thus, the comparison between the trot mode third travel motion and the trot mode fourth travel motion in the motion pattern of the movements of the left and right arm links 4L, 4R based on the movements of the left and right leg links 3L, 3R indicates that the trot mode third travel motion and the trot mode fourth travel motion are carried out such that the motion pattern of the left arm link 4L based on the motions of the left and right leg links 3L, 3R in the trot mode third travel motion and the motion pattern of the right arm link 4R based on the motions of the left and right leg links 3L, 3R in the trot mode fourth travel motion coincide with each other, and the motion pattern of the right arm link 4R based on the motions of the left and right leg links 3L, 3R in the trot mode third travel motion and the motion pattern of the left arm link 4L based on the motions of the left and right leg links 3L, 3R in the trot mode fourth travel motion coincide with each other.

More specifically, in the trot mode third travel motion and the trot mode fourth travel motion, the motion pattern of the right arm link 4R or the left arm link 4L based on the motions of the left and right leg links 3L, 3R is a motion pattern that defines the direction in which the distal end portion (the hand 23) of the right arm link 4R or the left arm link 4L is to be moved at a timing at which the distal end portion (the foot 13) of the left leg link 3L or the right leg link 3R is lifted off.

Further, in the trot mode third travel motion or the trot mode fourth travel motion, the control unit 40 generates the trajectories of the desired position and attitude of the lower base body 6 or the upper base body 7 by using an appropriate dynamic model so as to achieve the desired trajectory of the ZMP set according to the trajectories of the desired position and attitude of each of the feet 13 and the hands 23, as in the case of the crawl mode.

Further, the control unit 40 generates the trajectory of a desired amount of displacement as the control target of each joint of the robot 1 according to a technique, such as the resolved momentum control, by using the trajectories of the desired position and attitude of each of the feet 13 and the hands 23 and the trajectories of the desired position and attitude of the lower base body 6 or the upper base body 7.

Then, the control unit 40 controls the joint actuators 41 that correspond to the individual joints so as to move the joints according to the trajectories of the desired amounts of displacement.

In the present embodiment, the travel of the robot 1 in one of the first to the fourth travel motions is carried out by the control processing described above.

According to the present embodiment, the robot 1 travels in the direction of the front side of the upper base body 7 of the robot 1 in both the first travel motion and the second travel motion, in which the travel of the robot 1 is performed by the motions of the leg links 3R, 3L. This enables the robot 1 to travel while observing the external world condition ahead in the traveling direction (on the front side of the upper base body 7) of the robot 1 by the camera 47.

Further, even if the destination to which the robot 1 travels has a relatively small space, the robot 1 is capable of performing a required task by moving the hands 23 of the arm links 4 on the front side of the upper base body 7 without, for example, switching the direction of the robot 1 at the destination.

Further, especially in the second travel motion, each of the leg links 3 bends such that the middle portion (the knee) of each of the leg links 3 juts out to the opposite side from the front side in the traveling direction, i.e., the front side of the upper base body 7, of the robot 1. Therefore, when the robot 1 is instructed to climb up the relatively high step A illustrated in FIG. 5, the travel of the robot 1 can be accomplished without the occurrence of the interference between the leg links 3 of the robot 1 and an external world object.

When instructing the robot 1 to, for example, climb down the relatively high step A illustrated in FIG. 5, the travel of the robot 1 can be accomplished without the occurrence of the interference between the leg links 3 and an external world object by performing the travel of the robot 1 in the first travel motion.

Further, even if a space does not allow the robot 1 to stand up due to, for example, a low ceiling in an environment in which the robot 1 travels, it is possible for the robot 1 to travel in the third travel motion or the fourth travel motion.

At this time, especially in the fourth travel motion, the leg links 3 bend such that the middle portions (the knees) of the leg links 3 jut out toward the rear side of the upper base body 7 of the robot 1. Therefore, even if the projection B lies on a floor in an environment in which the robot 1 travels, as illustrated in FIG. 7, the travel of the robot 1 can be accomplished without causing, for example, the interference between the leg links 3 of the robot 1 and the projection B or the interference between the leg links 3 and the base body assembly 2.

Further, it is possible to enable the robot 1 to climb up or down the ladder C or a stepladder without causing the interference between the leg links 3 of the robot 1 and the ladder C or the stepladder by instructing the robot 1 to climb up or down the ladder C or the stepladder illustrated in FIG. 8 in the fourth travel motion.

A description will now be given of a few modifications related to the embodiment described above.

In the foregoing embodiment, the leg links 3 are configured to bend such that the middle portions (the knees) thereof jut out toward the front side of the lower base body 6. Alternatively, however, the leg links 3 may be configured to bend such that the middle portions (the knees) thereof jut out toward the rear side of the lower base body 6.

In this case, the first travel motion and the third travel motion, in which the base body assembly 2 is set to the standard base body twist state, will be the same travel motions as the second travel motion and the fourth travel motion, respectively, in the foregoing embodiment, and the second travel motion and the fourth travel motion, in which the base body assembly 2 is set to the reverse base body twist state, will be the same travel motions as the first travel motion and the third travel motion, respectively, in the foregoing embodiment.

Further, the foregoing embodiment illustrates the mobile robot 1 capable of performing the four modes of travel motions, namely, the first to the fourth travel motions. The mobile robot 1 in accordance with the present invention may be a mobile robot that does not perform one or both of the first travel motion and the second travel motion, or a mobile robot that does not perform one or both of the third travel motion and the fourth travel motion.

Further, the foregoing embodiment illustrates the mobile robot 1 provided with the two leg links 3R, 3L. However, the mobile robot in accordance with the present invention may alternatively be provided with three or more leg links. Further alternatively, the mobile robot may be provided with no arm link or a single arm link, or three or more arm links.

Further, the foregoing embodiment is provided with the camera 47, which captures images on the front side of the upper base body 7, as an external world condition observation instrument. Alternatively, however, the external world condition observation instrument, such as the camera 47, may be configured to be capable of observing the external world conditions on the lateral side or the rear side of the upper base body 7 rather than only on the front side of the upper base body 7.

Further, the mobile robot 1 according to the foregoing embodiment may be configured to be capable of performing a travel motion, such as walking sideways, as necessary, in addition to the first to the fourth travel motions.

What is claimed is:

1. A mobile robot comprising:
   a base body assembly;
   a plurality of movable links including a plurality of leg links extended from the base body assembly; and
   a joint provided between a distal end portion of each of the movable links and the base body assembly such that each of the movable links can be moved with respect to the base body assembly,
   wherein the base body assembly is constituted of a lower base body from which the plurality of leg links are extended and an upper base body connected to the lower base body such that the upper base body is relatively rotatable about an axial center in the direction of a trunk axis with respect to the lower base body,
   the upper base body can be operated in a state in which a front side of the upper base body is oriented to face the same direction as a front side of the lower base body and in another state in which the front side of the upper base body is oriented to face the same direction as a rear side of the lower base body by a relative rotation about the axial center in the direction of the trunk axis,
   each of the leg links is configured to be bendable such that a middle portion between a distal end portion thereof and the lower base body juts out toward either the front side or the rear side of the lower base body,
   the mobile robot includes at least one of an external world condition observation instrument for observing an external world condition on the front side of the upper base body and an arm link as a movable link extended from the upper base body, and
   the mobile robot is configured to be capable of selectively performing a first travel motion, in which the mobile robot travels in the direction of a front side of the upper base body by a motion in which a distal end portion of each of the plurality of the leg links is lifted off and then landed following the lifting off in a state in which the front side of the upper base body is oriented to face the same direction as the front side of the lower base body, and a second travel motion, in which the mobile robot travels in the direction of the front side of the upper base body by a motion in which a distal end portion of each of the plurality of the leg links is lifted off and then landed following the lifting off in a state in which the front side of the upper base body is oriented to face the same direction as the rear side of the lower base body.

2. The mobile robot according to claim 1, comprising:
   the arm link,
   wherein the mobile robot is configured to be capable of selectively performing a third travel motion, in which the mobile robot travels by a motion in which a distal end portion of each of the plurality of the leg links and the arm link is lifted off and then landed on the front side of the upper base body following the lifting off in a state in which the front side of the upper base body is oriented to face the same direction as the front side of the lower base body, and a fourth travel motion, in which the mobile robot travels by a motion in which the distal end portion of each of the plurality of the leg links and the arm link is lifted off and then landed on the front side of the upper base body following the lifting off in a state in which the front side of the upper base body is oriented to face the same direction as the rear side of the lower base body, in addition to the first travel motion and the second travel motion.

3. The mobile robot according to claim 1, comprising:
   two leg links, namely, a leg link on the right side and a leg link on the left side as observed facing the front of the lower base body, and two arm links, namely, an arm link on the right side and an arm link on the left side as observed facing the front of the upper base body,
   wherein the first travel motion and the second travel motion are travel motions in which the two arm links are moved according to the motions of the two leg links, and the first travel motion and the second travel motion are carried out such that a motion pattern of the arm link on the right side based on the motions of the two leg links in the first travel motion and a motion pattern of the arm link on the left side based on the motions of the two leg links in the second travel motion agree with each other, and a motion pattern of the arm link on the left side based on the motions of the two leg links in the first travel motion and a motion pattern of the arm link on the right side based on the motions of the two leg links in the second travel motion agree with each other.

4. The mobile robot according to claim 2, comprising:
   two leg links, namely, a leg link on the right side and a leg link on the left side as observed facing the front of the lower base body, and two arm links, namely, an arm link on the right side and an arm link on the left side as observed facing the front of the upper base body,
   wherein the third travel motion and the fourth travel motion are travel motions in which the two arm links are moved according to the motions of the two leg links, and the third travel motion and the fourth travel motion are carried out such that a motion pattern of the arm link on the right side based on the motions of the two leg links in the third travel motion and a motion pattern of the arm link on the left side based on the motions of the two leg links in the fourth travel motion agree with each other, and a motion pattern of the arm link on the left side based on the motions of the two leg links in the third travel motion and a motion pattern of the arm link on the right side based on the motions of the two leg links in the fourth travel motion agree with each other.

5. A mobile robot comprising:
   a base body assembly;
   a plurality of movable links including a plurality of leg links extended from the base body assembly; and
   a joint provided between a distal end portion of each of the movable links and the base body assembly such that each of the movable links can be moved with respect to the base body assembly,
   wherein the base body assembly is includes a lower base body from which the plurality of leg links are extended and an upper base body connected to the lower base body such that the upper base body is relatively rotatable about an axial center in the direction of a trunk axis with respect to the lower base body,
   the upper base body can be placed in a state in which a front side of the upper base body is oriented to face the same direction as a front side of the lower base body and a state in which the front side of the upper base body is oriented to face the same direction as a rear side of the lower base body by a relative rotation about the axial center in the direction of the trunk axis, each of the leg links is configured to be bendable such that a middle portion thereof between a distal end portion thereof and the lower base body juts out toward either the front side or the rear side of the lower base body, the mobile robot includes an arm link as a movable link extended from the upper base body, and the mobile robot is configured to be capable of selectively performing a third travel motion, in which the mobile robot travels by a motion in which a distal end portion of each of the plurality of the leg links and the arm link is lifted off and then landed on the front side of the upper base body following the lifting off in a state in which the front side of the upper base body is oriented to face the same direction as the front side of the lower base body, and a fourth travel motion, in which the mobile robot travels by a motion in which a distal end portion of each of the plurality of the leg links and the arm link is lifted off and then landed on the front side of the upper base body following the lifting off in a state in which the front side of the upper base body is oriented to face the same direction as the rear side of the lower base body.

6. The mobile robot according to claim 5, comprising:

two leg links, namely, a leg link on the right side and a leg link on the left side as observed facing the front of the lower base body and two arm links, namely, an arm link on the right side and an arm link on the left side as observed facing the front of the upper base body, wherein the third travel motion and the fourth travel motion are travel motions in which the two arm links are moved according to the motions of the two leg links, and the third travel motion and the fourth travel motion are performed such that a motion pattern of the arm link on the right side based on the motions of the two leg links in the third travel motion and a motion pattern of the arm link on the left side based on the motions of the two leg links in the fourth travel motion agree with each other, and a motion pattern of the arm link on the left side based on the motions of the two leg links in the third travel motion and a motion pattern of the arm link on the right side based on the motions of the two leg links in the fourth travel motion agree with each other.

* * * * *